US012754571B2

(12) United States Patent
Je et al.

(10) Patent No.: US 12,754,571 B2
(45) Date of Patent: Oct. 6, 2026

(54) LANDSCAPE GENERATION SYSTEM

(71) Applicant: Southern University of Science and Technology, Shenzhen (CN)

(72) Inventors: Seungwoo Je, Shenzhen (CN); Tianze Xie, Shenzhen (CN); Yilong Lin, Shenzhen (CN); Yuxin Ma, Shenzhen (CN); Kaihan Wang, Shenzhen (CN); Zezheng Guan, Shenzhen (CN); Yingjie Chang, Shenzhen (CN)

(73) Assignee: Southern University of Science and Technology, Shenzhen (CN)

( * ) Notice: Subject to any disclaimer, the term of this patent is extended or adjusted under 35 U.S.C. 154(b) by 32 days.

(21) Appl. No.: 19/063,207

(22) Filed: Feb. 25, 2025

(65) Prior Publication Data

US 2026/0065809 A1 Mar. 5, 2026

(30) Foreign Application Priority Data

Aug. 30, 2024 (CN) ......................... 202411205899.0
Aug. 30, 2024 (CN) ......................... 202411214664.8

(51) Int. Cl.
*G09B 25/06* (2006.01)
*G05D 5/00* (2006.01)

(52) U.S. Cl.
CPC ............... *G05D 5/00* (2013.01); *G09B 25/06* (2013.01)

(58) Field of Classification Search
CPC ...................................................... G09B 25/06
USPC ........................................................... 463/31
See application file for complete search history.

(56) References Cited

PUBLICATIONS

Chinese patent publication CN112382192A by Chen, published Feb. 19, 2021.*
English machine translation of Chinese patent publication CN112382192A by Chen, published Feb. 19, 2021.*
Chinese patent publication CN110111672A by Chen, published Aug. 9, 2019.*
English machine translation of Chinese patent publication CN110111672A by Chen, published Aug. 9, 2019.*

* cited by examiner

*Primary Examiner* — Michael C Grant

(57) ABSTRACT

A landscape generation system includes at least one landscape generation module, each landscape generation module includes a base frame, and N telescopic units connected with the base frame and arranged in an array; each telescopic unit includes a landscape creation part, and a driving mechanism mechanically connected with the landscape creation part and the base frame; and the driving mechanism drives, during operation, the landscape creation part to move within a preset interval along a target direction to adjust a distance between an end face of the landscape creation part and the base frame, and stops and locks the landscape creation part at any position in the preset interval so as to generate part of a preset landscape. A landscape can be generated by the landscape generation system to meet a user's needs for landscapes in different occasions and enhance the user experience.

20 Claims, 14 Drawing Sheets

B

LANDSCAPE GENERATION SYSTEM

RELATED APPLICATIONS

The present application claims the benefit of priority to 30 Aug. 2024 patent application No. 202411214664.8, filed 30 Aug. 2024, and entitled "LANDSCAPE GENERATION SYSTEM," and claims the benefit of priority to 30 Aug. 2024 patent application No. 202411205899.0, filed 30 Aug. 2024, and entitled "LANDSCAPE GENERATION SYSTEM," the entire contents of each of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to the field of landscape design, and in particular, to a landscape generation system.

BACKGROUND

With the rapid development of information technology, the presentation of spatial information has gradually evolved from 2D to 3D. This shift is driven by the fact that 3D can represent the real world more intuitively and realistically. In many scenarios, 3D presentation meets the need for immersive experiences or three-dimensional visualization of landscapes. For instance, during stage performances, stage designers often place props to simulate the story's setting, enhancing the audience's experience. Similarly, when users engage in entertainment activities using Virtual Reality (VR) devices, they not only want to see game scenes visually represented but also expect the activity space to generate those game scenes within it. This allows users to interact with the generated landscapes, providing a more immersive and engaging gaming experience. Another example is city planners, who aim to create three-dimensional representations of cities during urban planning. This approach offers a more intuitive way to showcase the resources in both aerial and underground spaces, exploring their potential use in urban development and providing residents with richer social spaces. Likewise, architects often seek to present their designs in a more three-dimensional manner, offering viewers a clearer and more realistic visualization of their work.

The content in the background section is merely information known to the inventors, and neither represents that the above information has been found in the public field prior to the filing date of the present disclosure nor represents that it can become the prior art of the present disclosure.

SUMMARY

This disclosure provides a landscape generation system in which a landscape creation part is controlled by a control module to rise and fall freely, and the landscape creation part is locked at any position so as to generate a preset landscape. The landscape generation system can meet a user's needs for stereoscopic landscapes in different occasions and enhance the user experience in the occasions.

The landscape generation system includes: at least one landscape generation module, where each landscape generation module includes: a base frame; and N telescopic units, connected with the base frame and arranged in an array, where N is an integer greater than 1, and each telescopic unit includes: a landscape creation part, and a driving mechanism, mechanically connected with the landscape creation part and the base frame, during operation, the driving mechanism drives the landscape creation part to move within a preset interval along a target direction to adjust a distance between an end face of the landscape creation part and the base frame, and stops and locks the landscape creation part at any position within the preset interval so as to generate part of a preset landscape.

In conclusion, this disclosure provides a landscape generation system. The landscape creation parts of the landscape generation system can be driven by the driving mechanisms to move to generate the preset landscape so as to meet the user's needs for landscapes in different occasions and enhance the user experience in the occasions. Moreover, the driving mechanisms can be self-locked so that the landscape creation parts can be locked at any positions, thus maintaining the generated preset landscape.

From the above technical solutions, the landscape generation system provided in this disclosure is configured to control M×N landscape creation parts by the control module to rise and fall and lock the landscape creation parts at any positions, thereby generating the preset landscape. The user's needs for stereoscopic landscapes in different occasions are met and the user experience in different occasions is enhanced.

Other functions of the landscape generation system provided in this disclosure will be enumerated in part in the following description. According to the description, the contents presented by reference numerals and examples will be apparent for those of ordinary skill in the art. Creative aspects of the landscape generation system provided in this disclosure may be fully explained by practice or by using the methods, devices, and combinations described in the following detailed examples.

BRIEF DESCRIPTION OF THE DRAWINGS

To describe the technical solutions in the embodiments of this disclosure more clearly, the accompanying drawings required for describing the embodiments are briefly described below. Apparently, the accompanying drawings in the following description show merely some exemplary embodiments of this disclosure, and a person of ordinary skill in the art may derive other drawings from these accompanying drawings without creative efforts.

DETAILED DESCRIPTION

Figure 1A:
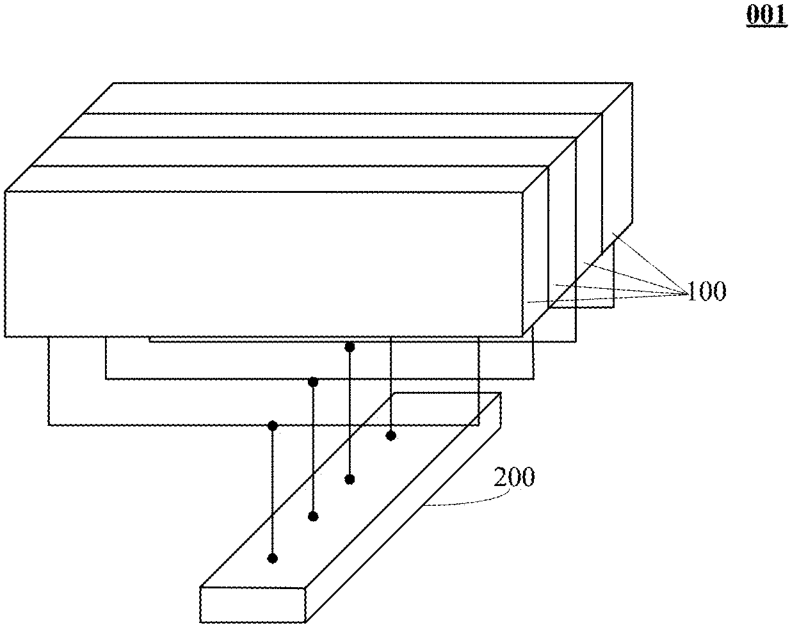
FIG. 1A is a structural schematic diagram of a landscape generation system provided according to some exemplary embodiments of this disclosure.

The following description provides specific application scenarios and requirements of this disclosure, with the purpose of enabling those skilled in the art to make and use the content in this disclosure. For those skilled in the art, various partial modifications to the disclosed embodiments are obvious, and without departing from the spirit and scope of this disclosure, the general principles defined herein can be applied to other embodiments and application. Therefore, the specification is not limited to the embodiments, but is the consistent with the widest scope of claims.

Unless otherwise defined, all technical and scientific terms used herein have the same meanings as commonly understood by those skilled in the technical field of the present disclosure. The terms used herein are merely intended to describe the specific embodiments, rather than limit the present disclosure. The terms "includes" and "has" in the specification, claims, and accompanying drawings of the present disclosure and any variations thereof are intended to encompass without excluding other content.

In the description of the embodiments of the present disclosure, the technical terms such as "first" and "second" are used merely to distinguish different objects, and cannot be understood as indicating or implying relative importance or implicitly indicating a number, a specific order, or a primary/secondary relationship of the indicated technical features. In the description of the embodiments of the present disclosure, "a plurality of" means two or more, unless otherwise specifically defined.

The terms used herein are merely intended to describe specific examples or embodiments, rather than to limit the present disclosure. For example, unless expressly stated otherwise, the singular forms "a", "an" and "this" used herein may also include plural forms. In the present disclosure, the terms "include" and/or "comprise" refer to the existence of an associated integer, step, operation, element, component and/or group, without excluding the existence of one or more other features, integers, steps, operations, elements, components and/or groups. In other words, other features, integers, steps, operations, elements, components and/or groups may be added to the system/method.

In the description of the embodiments of the present disclosure, the term "and/or" merely describes associations between associated objects, and it indicates three types of relationships. For example, A and/or B may indicate that A exists alone, A and B exist at the same time, or B exists alone. In addition, the character "/" in this disclosure generally indicates that the associated objects are in an "or" relationship.

In the present disclosure, "X includes at least one of A, B, or C" means X includes at least A, X includes at least B, or X includes at least C. In other words, X may include only any combination of A, B, and C, or include any combination of A, B, and C and other possible content/element. The any combination of A, B, and C may be A, B, C, AB, AC, BC, or ABC.

In the present disclosure, unless otherwise explicitly specified, an association relationship between structures may be a direct association relationship or an indirect association relationship. For example, for the description "A is connected to B", unless it is explicitly described that A is directly connected to B, it will be construed as that A may be directly connected to B or indirectly connected to B. In another example, for the description "A is over B", unless it is explicitly described that A is directly above B (A and B are adjacent and A is above B), it will be construed as that A may be directly above B, or A may be indirectly over B (A and B are spaced apart by other element and A is above B), and so on.

In the description of the embodiments of the present disclosure, the term "a plurality of" refers to two or more, and similarly, "a plurality of groups" refers to two or more groups and "a plurality of electrodes" refers to two or more electrodes.

In the description of the embodiments of the present disclosure, the technical terms such as "central", "longitudinal", "transverse", "length", "width", "thickness", "upper", "lower", "front", "back", "left", "right", "vertical", "horizontal", "top", "bottom", "inner", "outer", "clockwise", "anticlockwise", "axial direction", "radial direction", and "circumferential direction" are orientations or positional relationships shown based on the accompanying drawings. These terms are merely intended to facilitate describing the embodiments of the present disclosure and make the description simple, rather than to indicate or imply that a mentioned apparatus or element must have a specific orientation or be constructed and operated in the specific orientation. Therefore, these terms cannot be construed as a limitation to the present disclosure.

In the description of the embodiments of the present disclosure, unless otherwise clearly specified and defined, the technical terms such as "mounting", "interconnection", "connection" and "fixation" should be understood in a broad sense. For example, the "connection" may be a fixed connection, removable connection or integral connection; may be a mechanical connection or electrical connection; may be a direct connection or indirect connection through a medium; and may be a communication or interaction between two elements. Those of ordinary skill in the art may understand specific meanings of the foregoing terms in the disclosed embodiments according to specific circumstances.

In consideration of the following description, in the present disclosure, these and other features, the operations and functions of related elements of the structure, as well as the economy of the combination and manufacturing of components can be significantly improved. The description also includes figures and texts with reference to the figures in this disclosure, all of which form part of this disclosure. However, it should be clearly understood that the drawings are merely intended for illustration and description purposes, rather than to limit the scope of the present disclosure. It should be understood that the accompanying drawings are not drawn to scale.

The flowchart used in the present disclosure illustrates the operations implemented by the system according to some exemplary embodiments in the present disclosure. It should be clearly understood that the operations of the flowchart may be implemented out of sequence. Instead, operations may be implemented in reverse sequence or simultaneously. In addition, one or more other operations may be added to the flowchart. One or more operations may be removed from the flowchart.

For ease of understanding this disclosure by readers, at least some terms in this disclosure will be explained below.

Landscape: it may refer to a complex composed of topography, landform, soil, water, plants, animals, etc. within a certain region. The topography may refer to various undulating forms presented together by fixed objects distributed above ground. For example, the landscape may include a natural landscape and a human landscape. The human landscape may include a historical site landscape, architecture and facility landscape, a culture and art landscape, etc. The architecture and facility landscape may be a city community, a city building, a museum, an art museum, an opera house, a flower bed, a half-way house, a public chair, etc., which will not be limited here in this disclosure.

Figure 1B:
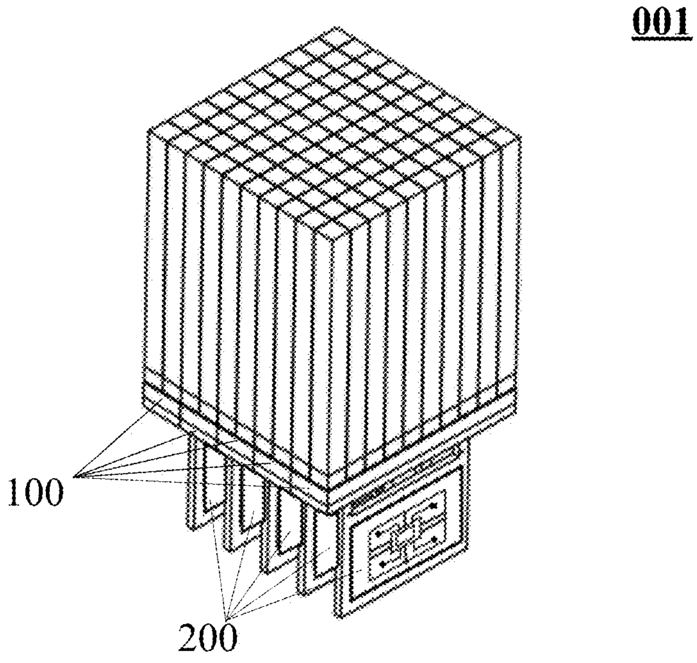
FIG. 1B is a structural schematic diagram of another landscape generation system provided according to some exemplary embodiments of this disclosure.

FIG. 1A is a structural schematic diagram of a landscape generation system 001. FIG. 1B is a structural schematic diagram of another landscape generation system 001. The landscape generation system 001 includes M landscape generation modules 100 and a control module 200. M is an integer greater than or equal to 1. For example, the landscape generation system 001 illustrated in FIG. 1A includes 4 landscape generation modules 100, where M=4. In another example, the landscape generation system 001 shown in FIG. 1B includes 5 landscape generation modules 100, where M=5. The control module 200 may be in communication connection with a plurality of landscape generation modules 100 to run and control corresponding landscape generation modules 100 to generate a preset landscape. For example, as shown in FIG. 1A, the control module 200 may be in wired communication connection with the landscape generation modules 100 through data lines.

A user can control, by means of the control module 200, M landscape generation modules 100 of the landscape generation system 001 to generate the preset landscape, thereby meeting the user experience needs in different occasions or the user's needs for stereoscopic landscapes. For example, when the user uses the device based on the VR technology to play a golf game, the preset landscape may be a different region in an actual golf course. For example, the preset landscape is a raised prairie land in the golf course. In another example, the preset landscape is a sunken sand pit in the golf course. In some exemplary embodiments, the preset landscape may include a preset building landscape and/or a preset facility landscape. For example, the preset landscape may be a building in a city, including a music hall, a museum, etc. In another example, the preset landscape may be a community in a city. The community may include a residential building and supporting community supermarket, hospital, etc. In another example, the preset landscape may be a chair in a park or fitness equipment in the park.

Figure 2:
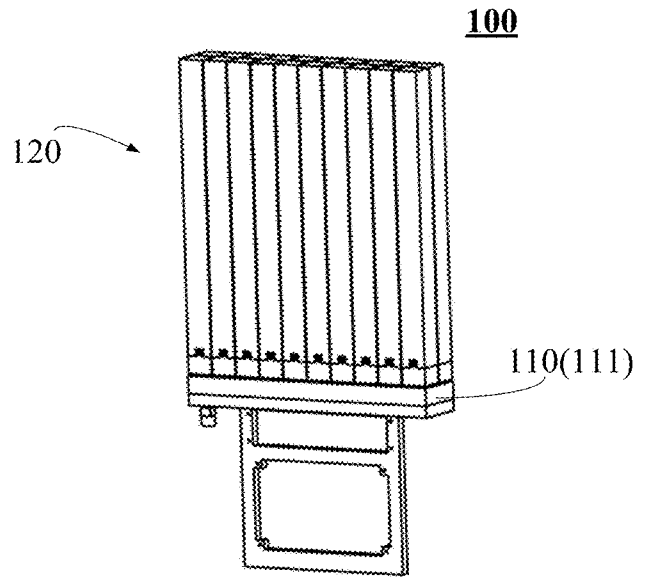
FIG. 2 is a structural schematic diagram of a single landscape generation module provided according to some exemplary embodiments of this disclosure.

FIG. 2 is a structural schematic diagram of a single landscape generation module 100. Each landscape generation module 100 of M landscape generation modules 100 may have part or all of structural features or characteristics described below. Each landscape generation module 100 includes a base frame 110, and N telescopic units 120 connected with the base frame 110 and arranged in an array. N is an integer greater than 1.

The base frame 110 may be a supporting component for the whole landscape generation module 100. As shown in FIG. 2, the base frame 110 may be located at a bottom of the whole landscape generation module 100. Other members (e.g., the N telescopic units 120 and the control module 200) can be mounted on the base frame 110 or connected with the base frame 110. As shown in FIG. 2, the base frame 110 may include a first base 111. The N telescopic units 120 are mechanically connected with the first base 111. The mechanical connection mentioned here and the mechanical connection mentioned below may be adhesive bonding, welding, lock seaming, riveting, etc., which will not be defined here in this disclosure.

A specific shape of the base frame 110 may be set according to a scene requirement, which will not be defined here in this disclosure. For example, the first base 111 shown in FIG. 2 is a cuboid. The shape of the base frame 110 is set to be the cuboid so that the base frames 110 of the M landscape generation modules 100 can be placed closely, leaving a small gap between the base frames 110 and making the generated preset landscape continuous and ornamental.

In some exemplary embodiments, in addition to the first base 111, the base frame 110 may further include a second base 112 (not shown in FIG. 2). The specific structure of the base frame 110 including the second base 112 will be described below.

The N telescopic units 120 may be connected with the base frame 110 and arranged in an array. N is an integer greater than 1. For example, the value of N may be 2, 3, 4, 5, 10, 15, 20, etc. The number of the telescopic units 120 and the arrangement manner of the N telescopic units may be selected according to an actual occasion and the specific situation of the preset landscape, which will not be required here in this disclosure. For example, in FIG. 2, the landscape generation module 100 includes 20 telescopic units 120 distributed in a 2×10 array.

By arranging the N telescopic units 120 in the array, the space can be utilized more effectively, and different needs of users for landscape can be met by adjusting the number and the arrangement manner of the telescopic units 120. Meanwhile, the arrayed arrangement of the N telescopic units 120 may also make the landscape generation module 100 visually neat and beautiful.

Figure 3:
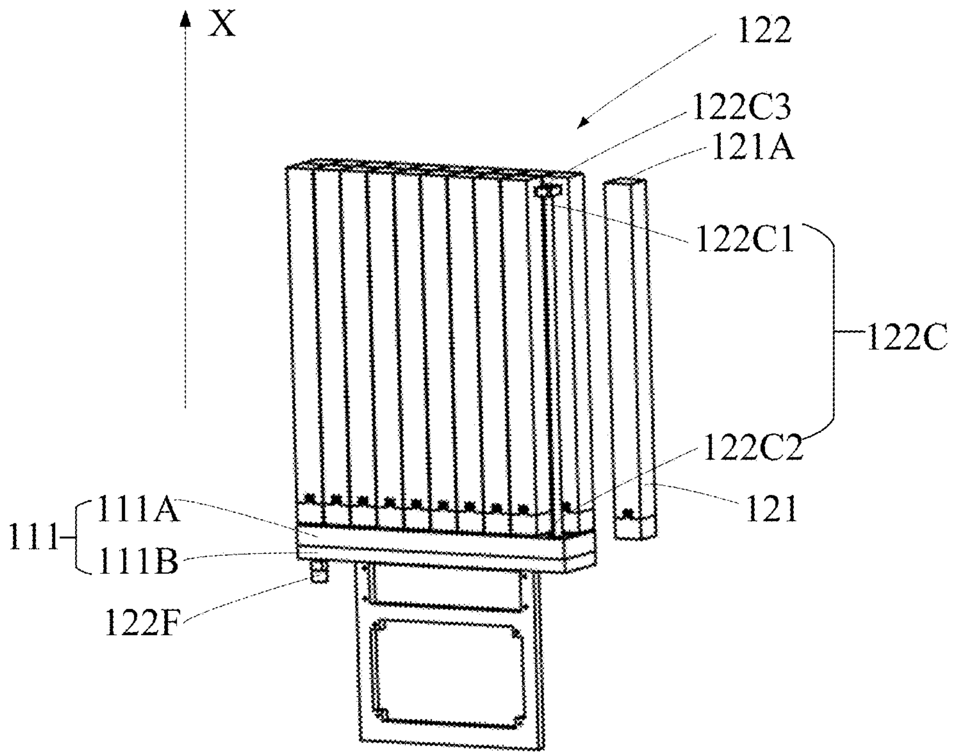
FIG. 3 is a structural schematic diagram of a telescopic unit provided according to some exemplary embodiments of this disclosure.

FIG. 3 is a structural schematic diagram of a telescopic unit 120. Each telescopic unit 120 includes a landscape creation part 121, and a driving mechanism 122 mechanically connected with the landscape creation part 121 and the base frame 110. The driving mechanism 122, when working, can drive the landscape creation part 121 to move.

The landscape creation part 121 can be configured to generate the preset landscape. As described previously, the landscape generation system 001 includes M landscape generation modules 100 arranged in an array, and each landscape generation module 100 includes N telescopic units 120 arranged in an array. Each telescopic unit includes the landscape creation part 121. Therefore, the landscape generation system 001 includes M×N landscape creation parts 121 arranged in an array. All the (M×N) landscape creation parts 121 in the landscape generation system 001 can generate the preset landscape together, where N landscape creation parts 121 of each landscape generation module 100 can generate part of the preset landscape.

The landscape creation part 121 can extend along a target direction. The target direction may be a moving direction of the landscape creation part 121, namely the direction in which the landscape creation part 121 creates the preset landscape. The target direction may also be called a landscape creation direction. For example, the target direction may be the X-axis direction shown in FIG. 3. The landscape creation part 121 may be a prism extending along the X-axis direction. The landscape creation part 121 is of a cuboid prism structure having a rectangular cross section so that a plurality of landscape creation parts 121 distributed in an array can be arranged closely, leaving a small gap between the landscape creation parts 121 and making the generated preset landscape continuous and ornamental. In another example, the target direction may be any other direction in which the user wants to generate the preset landscape. For example, the target direction may be a direction forming any non-zero included angle with the X-axis in FIG. 3. Of course, the cross section of the landscape creation part 121 may also be in other polygons or be circular. In some exemplary embodiments, the landscape creation part 121 may be of a solid structure so as to have higher mechanical strength. In some other embodiments, the landscape creation part 121 may be of a hollow structure so as to reduce the weight and reduce the driving burden of the driving mechanism 122.

Figure 4A:
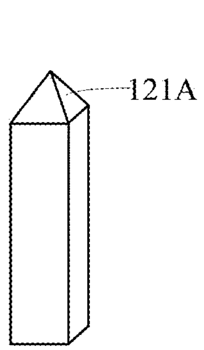
FIG. 4A is a structural schematic diagram of a landscape creation part provided according to some exemplary embodiments of this disclosure.
Figure 4B:
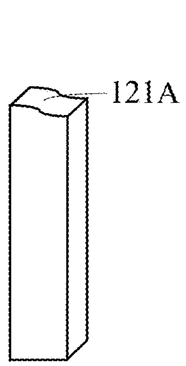
FIG. 4B is a structural schematic diagram of another landscape creation part provided according to some exemplary embodiments of this disclosure.

The landscape creation part 121 may include an end face 121A away from the base frame 110. As shown in FIG. 3, the end face 121A may be a flat face. The end face 121A of the landscape creation part 121 may also be of other structures according to characteristics of the preset landscape and effects to be achieved. FIG. 4A is a structural schematic diagram of a landscape creation part 121. FIG. 4B is a structural schematic diagram of another landscape creation part 121. As shown in FIG. 4A, the landscape creation part 121 may be a complex of a prism and a pyramid. In this case, the end face 121A of the landscape creation part 121 is a side face of the pyramid. In another example, as shown in FIG. 4B, the end face 121A of the landscape creation part 121 may be an approximately wavy curved surface. The landscape creation parts 121 in different shapes can allow the preset landscape to present different effects. According to different landscape requirements, the landscape generation module 100 can be equipped with different landscape creation parts 121 to generate the preset landscape such that the generated preset landscape is more realistic. The M×N landscape creation parts 121 of the M×N telescopic units 120 included in the M landscape generation modules 100 may have different end faces 121A to form richer, more complex preset landscapes.

With continued reference to FIG. 3, the overall size of the M landscape generation modules 100 can be selected according to application occasions. When the area of the region occupied by the generated preset landscape is relatively large, the area of a single landscape creation part 121 constituting the preset landscape may be relatively large. When the area of the region occupied by the generated preset landscape is relatively small, the area of a single landscape creation part 121 constituting the preset landscape may be relatively small. For example, in some exemplary embodiments, a value range of an edge length of each landscape creation part 121 may be 2 cm to 4 cm. For example, the edge length of each landscape creation part 121 may be 2 cm, 2.5 cm, 2.9 cm, 3 cm, 3.5 cm, 4 cm, etc., and values between any two values.

In some exemplary embodiments, each landscape creation part 121 may have a first projection in the target direction. The area of the first projection may be between 4 and 16 $cm^2$. Since the N telescopic units 120 are arranged in the array, the first projection of the landscape creation part 121 in the target direction should fall into the projection of the base frame 110 in the target direction, or the projection of the base frame 110 in the target direction needs to cover the first projection. Meanwhile, the driving mechanisms 122 for driving the landscape creation parts 121 need to be designed into arrangement along the target direction, and the projections thereof in the target direction cannot be larger than the first projection. This means the entire telescopic unit 120 extends along the target direction as an axis and does not occupy too much space in other directions than the target direction. Such a setup not only can save the space occupied by the landscape generation module 100, but also can make the gap between the landscape creation parts 121 of different telescopic units 120 small when the user looks the landscape creation parts 121 from the target direction or other directions. Thus, the generated preset landscape is more compact and is continuous and ornamental.

In some exemplary embodiments, the area of the first projections of all the landscape creation parts 121 of the entire landscape generation system 001 in the first target direction may be between 8 $cm^2$ and 180 $cm^2$. For example, the area of the first projection of one landscape creation part 121 may be 4 $cm^2$. When the landscape generation system 001 includes 20 landscape creation parts 121, the area of the first projections of the landscape creation parts 121 of the entire landscape generation system 001 is 80 $cm^2$. When the landscape generation system 001 includes 40 landscape creation parts 121, the area of the first projections of the landscape creation parts 121 of the entire landscape generation system 001 is 160 $cm^2$. In some other embodiments, the area of the first projections of the landscape creation parts 121 of the entire landscape generation system 001 in the target direction may be greater than 180 $cm^2$. For example, the area of the first projection of one landscape creation part 121 may be 4 $cm^2$. When the landscape generation system 001 includes 80 landscape creation parts 121, the area of the first projections of the landscape creation parts 121 of the entire landscape generation system 001 is 320 $cm^2$. In another example, the area of the first projection of one landscape creation part 121 may be 9 $cm^2$. When the landscape generation system 001 includes 40 landscape creation parts 121, the area of the first projections of the landscape creation parts 121 of the entire landscape generation system 001 is 360 $cm^2$.

The driving mechanism 122 is mechanically connected with the landscape creation part 121 and the base frame 110. When working, the driving mechanism 122 drives the landscape creation part 121 to move within a preset interval along the target direction, thereby adjusting a distance between the end face 121A of the landscape creation part 121 and the base frame 110 and stopping and locking the landscape creation part 121 at any position in the preset interval. As described previously, the target direction may be a direction in which the landscape creation part 121 creates the preset landscape. The driving mechanism 122 can adjust the distance between the end face of the landscape creation part 121 and the base frame 110 by changing a protruding distance of the landscape creation part 121 along the target direction, such that the landscape creation parts 121 are different in height in the target direction, thereby presenting the undulating state (topography) of the ground surface that the preset landscape has. The preset interval can be set according to the specific undulating state of the preset landscape. The preset interval can be delimited with the position that the end face 121A can reach as a benchmark, or may be set with the position that the other portions of the landscape creation part 121 can reach as a benchmark, which will not be defined here in this disclosure. A length of the preset interval may be a distance between two end faces 121A farthest from each other in the preset landscape.

The landscape creation part 121 moving along the target direction may be moving along the forward direction of the X-axis or may be moving along the backward direction of the X-axis, thereby forming a static landscape or a dynamic landscape. For example, the preset landscape is a building or a mountain. The landscape creation parts 121 may move from the position in contact with the base frame 110 along the forward direction of the X-axis to a position a certain distance from the base frame 110, forming the static building or mountain landscape. In another example, the preset landscape is a process of the ground collapsing. In order to present the process of the ground collapsing, the landscape creation parts 121 may move from a position a certain distance from the base frame 110 along the backward direction of the X-axis to come into contact with the base frame 110, thus creating the dynamic landscape of the ground collapsing.

There are many implementations of the driving mechanism 122 driving the landscape creation part 121 to move. In some exemplary embodiments, the driving mechanism 122 may include a gear-rack mechanism. In particular, a motor drives a gear; the gear is connected with a rack; and the rack is connected with the landscape creation part 121. The rack may extend along the target direction. Thus, when moving, the rack can drive the landscape creation part 121 to move forwards or backwards in the target direction. However, the gear-rack mechanism cannot complete self-locking. Therefore, due to an external force, the landscape creation part 121 cannot stop at any position of the preset interval by means of the driving mechanism 122, and the generated preset landscape cannot be maintained. For example, when the landscape creation part 121 is placed on the ground in the manner shown in FIG. 2, the external force is the gravity of the landscape creation part. In order to lock the landscape creation part 121, the landscape generation module 100 must further include a locking mechanism. The locking mechanism may be a ratchet wheel-teeth mechanism, or may be a worm wheel-worm mechanism, etc.

As described previously, the landscape creation part 121 has the first projection in the target direction. In some exemplary embodiments, the driving mechanism 122 has a second projection in the target direction, and the second projection is located within the first projection. Such a setup enables the driving mechanism 122 to be completely within the first projection when the user looks the landscape creation part 121 from the target direction or other directions. In this way, the driving mechanism 122 will not affect the operation of the neighboring telescopic unit 120. Meanwhile, such a design may result in a small gap between the adjacent landscape creation parts 121. Thus, the generated preset landscape is more compact and is continuous and ornamental. In some exemplary embodiments, the second projection being located within the first projection may include that a projection edge of the second projection is located inside a projection edge of the first projection. For example, when the landscape creation part 121 is a hollow cylinder, the projection of the landscape creation part 121 may be a circular ring. The projection of the corresponding driving mechanism 122 can be located within the internal region of the circle having a larger radius in the circular ring. In some other embodiments, the second projection is located within the projection region of the first projection. That is to say, the first projection completely covers the second projection. For example, when the landscape creation part 121 is a quadrangular prism as described above, the first projection is a rectangle. The projection of the corresponding driving mechanism 122 is covered with the rectangle.

When the area of the first projection is relatively small (ranging from 4 $cm^2$ to 16 $cm^2$), in order to make the second projection be within the first projection and enable the driving mechanism 122 to have certain mechanical strength in a first direction, the entire driving mechanism 122 needs to extend along the target direction as an axis. Therefore, the driving mechanism 122 must be a mechanism occupying a small space. The above-mentioned gear-rack mechanism occupies a large space and needs to be additionally provided with the locking mechanism, thus occupying larger overall space. It is hard for the second projection to be within the first projection. That is to say, if the gear-rack mechanism is used, the driving mechanism 122 cannot keep the landscape creation part 121 at a fixed position after generating the preset landscape while driving the landscape creation part 121 to move in limited space. Therefore, apart from driving the landscape creation part 121 to move, the driving mechanism 122 is further required to stop and lock the landscape creation part 121 at any position in the preset interval, thus generating part of the preset landscape. In this way, the driving mechanism 122 does not need an additional locking mechanism to fix the preset landscape so that the space occupied by the telescopic unit 120 can be reduced.

Therefore, the driving mechanism 122 may be a lead screw transmission mechanism. For example, the driving mechanism 122 includes a driving element 122A (not shown in FIG. 3) and a lead screw 122C. Since the landscape creation part 121 and the driving element 122A are located on the same side of the base frame 110, the driving element 122A may be connected with the landscape creation part 121. The lead screw 122C includes a first end 122C1 and a second end 122C2. The lead screw 122C is disposed along the target direction and is in threaded connection with the driving element 122A. When rotating, the lead screw 122C can drive the driving element 122A to move between the first end 122C1 and the second end 122C2. A distance between the first end 122C1 and the second end 122C2 may be the length of the preset interval. When the driving element 122A is at the second end 122C2, the landscape creation part 121 may be located at a position closest to the first base 111 in the preset interval, and the landscape creation part 121 is located at the lowest point in the preset interval. When the driving element 122A is at the first end 122C1, the landscape creation part 121 is located at a position farthest away from the first base 111 in the preset interval, and the landscape creation part 121 is located at the highest point in the preset interval.

Figure 5:
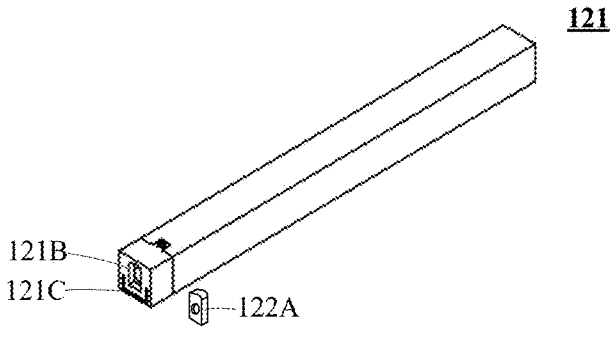
FIG. 5 is a structural schematic diagram of a landscape creation part and a driving element provided according to some exemplary embodiments of this disclosure.

FIG. 5 is a structural schematic diagram of a landscape creation part 121 and a driving element 122A. As shown in FIG. 5, a first notch 121B for holding the driving element 122A may be formed in the bottom of the landscape creation part 121. The driving element 122A may be clamped at or bonded to the first notch 121B. There may be a screw thread in a small hole of the driving element 122A.

In order to realize self-locking of the driving mechanism 122, a lift angle of a screw thread of the lead screw 122C is smaller than a frictional angle of the threaded connection between the lead screw 122C and the driving element 122A. The frictional angle of threaded connection is also an equivalent frictional angle. After the driving mechanism 122 is self-locked, when acted upon by an external force along the target direction (e.g., an external force conducted from the landscape creation part 121), the driving element 122A does not slide or rotate along the lead screw so that the landscape creation part 121 can stop at the fixed position to maintain the preset landscape. However, the lift angle of the screw thread on the lead screw 122C cannot be too small (i.e., the lead of the lead screw 122C is too small), thereby avoiding that the advance distance by each rotation of the lead screw is too small, the speed of the landscape creation part 121 rising is low, and the time taken to form the preset landscape is long. As a result, the requirements of the user cannot be met. On the premise that self-locking can be satisfied, the specific lead of the screw thread can be selected according to the moving speed of the landscape creation part 121 required by the user, which will not be defined here in this disclosure.

In some exemplary embodiments, the driving mechanism 122 may further include a guide rail disposed along the target direction. The guide rail may be fixed connected with the first base 111. The landscape creation part 121 is slidably arranged on the guide rail. For example, the guide rail may be a U-shaped guide rail. By using the U-shaped guide rail, the rotation of the landscape creation part 121 can be better prevented, allowing for more stable motion. Correspondingly, the landscape creation part 121 may further include a second notch 121C for the U-shaped guide rail to pass therethrough. The landscape creation part 121 may form a guide pillar-guide sleeve structure with the U-shaped guide rail.

With continued reference to FIG. 3, the driving mechanism 122 may further include a motor assembly 122F. The motor assembly 122F may be connected with the second end 122C2 of the lead screw 122C. The motor assembly 122F, when working, can drive the lead screw 122C to rotate, thereby driving the landscape creation part 121 to move. In some exemplary embodiments, the motor assembly 122F includes only a motor. For example, the motor assembly 122F includes a step motor. The stepping motor is an open-loop control step motor that converts an electric pulse signal into an angular displacement or a linear displacement. When the step motor receives a pulse signal, it drives the step motor to rotate a fixed angle according to a set direction so that an amount of angular displacement can be controlled by controlling the number of pulses, thereby achieving the purpose of proper positioning. After the step motor receives a starting signal, namely the pulse signal, an output shaft of the step motor rotates a preset angle. Each rotation by the preset angle can drive the lead screw 122C to rotate a corresponding angle, thus driving the driving element 122A to move a preset distance. In some other embodiments, the motor assembly 122F may include a motor and a speed reducer. The speed reducer can be connected with the second end 122C2, and then the motor is connected with the speed reducer. The motor, when working, drives the lead screw 122C to rotate by means of the speed reducer. Since the original speed of the motor is usually fixed and is high, the motor is directly connected with the lead screw 122C, leading to a too high speed of the landscape creation part 121 to rise. Therefore, with the speed reducer, the rotating speed of the lead screw 122C can be adjusted to an appropriate speed so that the landscape creation part 121 can rise stably. For example, the rising speed of the landscape creation part 121 may be 10 mm/s to 15 mm/s. The rising speed may be 10 mm/s, 12 mm/s, 13 mm/s, 15 mm/s, or the like, and values between any two values.

The above-mentioned motor assembly 122F may include an output shaft. The output shaft may be directly connected with the lead screw 122C for transmission. In some exemplary embodiments, a straight groove may be formed in the second end 122C2 of the lead screw 122C, and is directly connected with a double-flat position shaft of the motor in the motor assembly 122F for transmission. Due to errors of manufacturing and mounting, the output shaft and the lead screw 122C may be slightly non-coaxial. The above-mentioned errors may cause vibration in the process of transferring rotation from the motor assembly 122F to the lead screw 122C. Therefore, in some exemplary embodiments, the output shaft of the motor assembly 122F may also be connected with the second end 122C2 by a coupling. With the coupling, the transmission of the rotation can be smoother so as to reduce the above-mentioned vibration such that the whole landscape generation module 100 is more sable.

The landscape generation module 100 further includes a limit switch. The motion of the driving element 122A is controlled to control the motion of the landscape creation part 121, thereby limiting the landscape creation part.

In some exemplary embodiments, each telescopic unit 120 may include a first switch. The first switch may be disposed on the first base 111. The first switch may be in communication connection with at least one of the driving mechanism 122 or the control module 200. The first switch may be disposed in a moving path of the driving element 122A. When the driving element 122A triggers the first switch during moving, the first switch may control the driving mechanism 122 to stop working. For example, the first switch can control the driving mechanism 122 to stop driving the lead screw 122C to rotate or control the control module 200 to send an instruction of stopping running to the driving mechanism 122. In particular, the first switch may be disposed on a side of the first base 111 facing the driving element 122A. A clamping groove for mounting the first switch may be formed in the first base 111. When the driving element 122A moves along the backward direction of the X-axis, the height of the landscape creation part 121 is reduced. When the driving element 122A continues to move along the backward direction of the X-axis to come into contact with the first switch, i.e., when the driving element 122A is in contact with the first base 111, there is no space for the driving element 122A to continue moving, and the landscape creation part 121 moves to the lowest point of the preset interval. At this point, the driving mechanism 122 does not need to continue driving the driving element 122A to move, there is no need for continuing driving the lead screw 122C to rotate. Therefore, the driving element 122A touching the first switch may be regarded as a signal for stopping the driving mechanism 122 from driving the lead screw 122C to rotate. For example, the first switch may control the motor assembly 122F to stop rotating, thus stopping the lead screw 122C from rotating and saving energy.

In some exemplary embodiments, the first switch may be configured to control the initialization of M landscape generation modules 100. The initialization may be allowing M×N landscape creation parts 121 to be located at the same height. For example, the M×N landscape creation parts 121 are each located at the highest point of the preset interval. In another example, the M×N landscape creation parts 121 are each located at the lowest point of the preset interval, thus guaranteeing calibration of the height of each landscape creation part 121, such that the generated preset landscape is more accurate.

As described previously, the landscape creation part 121 may be of the solid structure. The landscape creation part 121 may also be of the hollow structure so as to reduce the weight and reduce the driving burden of the driving mechanism 122. When the landscape creation part 121 is hollow, the landscape creation part 121 is more prone to shaking in the moving process. Therefore, in some exemplary embodiments, the driving mechanism 122 may further include a limiting member 122C3. The limiting member 122C3 may be disposed at the first end 122C1 of the lead screw 122C and is abutted against the guide rail 122D and the landscape creation part 121 to limit the landscape creation part 121 from twisting. As shown in FIG. 3, the limiting member 122C3 may be sleeved on the top of the lead screw 122C. The limiting member 122C3 can restrain the relative position of the lead screw 122C and the U-shaped guide rail. One end of the limiting member 122C3 props against the U-shaped guide rail, while the other end props against the landscape creation part 121. Because the rigidity of the landscape creation part 121 might be insufficient, its angle may change and the landscape creation part cannot go up and down straightly along the target direction in the moving process. With the limiting member 122C3 for limiting, the landscape creation part 121 can be prevented from twisting and thus can be guaranteed not to deviate from the target direction, ensuring its motion stability. In some exemplary embodiments, the limiting member 122C3 is connected with the lead screw 122C by a bearing, thus avoiding influence on the rotary motion of the lead screw 122C.

Figure 6A:
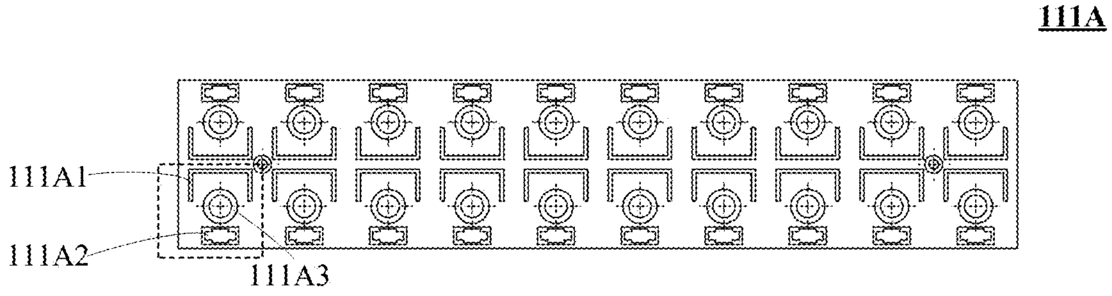
FIG. 6A is a structural schematic diagram of an upper-layer base provided according to some exemplary embodiments of this disclosure.
Figure 6B:
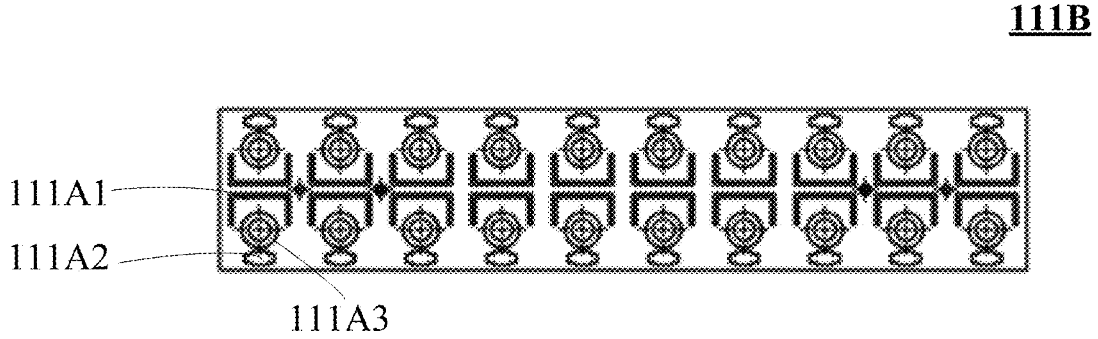
FIG. 6B is a structural schematic diagram of a lower-layer base provided according to some exemplary embodiments of this disclosure.

A reference is continuously made to FIG. 3. Since the lead screw 122C is too long, the landscape creation part 121 will shake when moving over the lead screw 122C. Therefore, the first base 111 can be thickened such that the area of the fixed lead screw 122C is increased. For example, in order to enable the first base 111 to have a great thickness, the first base 111 may include two layers. For example, the first base 111 may include an upper-layer base 111A and a lower-layer base 111B close to the landscape creation part 121. FIG. 6A is a structural schematic diagram of an upper-layer base 111A. FIG. 6B is a structural schematic diagram of a lower-layer base 111B. The portion marked by the dotted line in FIG. 6A is a connection structure of the first base 111 and one telescopic unit 120.

Taking FIG. 6A as an example, the upper-layer base 111A may be provided with a U-shaped guide rail placement location 111A1 and a limit switch placement location 111A2. The limit switch may be the first switch as described previously.

Apart from increasing the thickness of the first base 111 as described above, using a bearing, the fixation of the bottom of the lead screw 122C can also be strengthened, enhancing the stability of the lead screw 122C. In some exemplary embodiments, the first base 111 may include a bearing placement location 111A3 for placement of a thrust bearing, thus limiting the lead screw 122C from moving in the radial and axial directions and preventing the landscape creation part 121 from shaking. For example, one bearing is placed on the upper-layer base 111A, and two angular contact ball bearings are placed on the lower-layer base 111B to bear an axial thrust from the lead screw 122C.

The notch of the lower-layer base 111B is in one-to-one correspondence with the notch of the upper-layer base 111A, which will not be described redundantly here one by one. However, the U-shaped guide rail placement location 111A1 penetrates through the surface of the upper-layer base 111A and does not penetrate through the surface of the lower-layer base 111B such that the U-shaped guide rail is fixed at the lower-layer base 111B.

Figure 7:
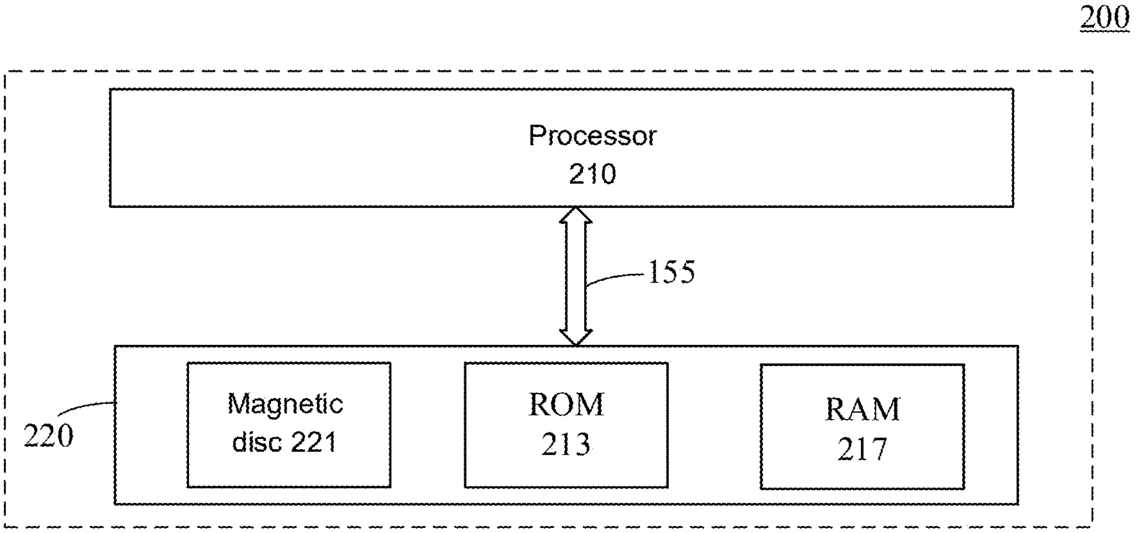
FIG. 7 is a schematic diagram of hardware of a control module provided according to some exemplary embodiments of this disclosure.

The control module 200 is configured to, when working, perform step P100 of generating the preset landscape, thus controlling M landscape generation modules 100 to generate the preset landscape. FIG. 7 is a schematic diagram of hardware of a control module 200. As shown in FIG. 7, the control module 200 may include at least one processor 210 and at least one storage medium 220.

The at least one storage medium 220 may store at least one instruction set for the generation of the preset landscape. The at least one processor 210 may be in communication connection with the storage medium 220. When the control module 200 works, the at least one processor 210 may read the at least one instruction set and perform the step P100 of generating the preset landscape.

The at least one storage medium 220 may include a data storage apparatus. The data storage apparatus may be a non-transitory storage medium, or may be a transitory storage medium. For example, the data storage apparatus may include one or more of a magnetic disk 221, a read-only storage medium (ROM) 223, or a random access storage medium (RAM) 227. The at least one storage medium 220 may further include at least one instruction set stored in the data storage apparatus. The at least one instruction set is configured to generate the preset landscape. The instructions may be computer program codes. The computer program codes may include a program, a routine, an object, a component, a data structure, a process, a module, and the like for performing the method for generating a preset landscape provided in this disclosure.

The at least one processor 210 may be communicatively connected to the at least one storage medium 220 by using an internal communications bus. The at least one processor 210 is configured to execute the above-mentioned at least one instruction set. When the control module 200 works, the at least one processor 210 may read the at least one instruction set and perform the step P100 of generating the preset landscape provided in this disclosure according to the instructions of the at least one instruction set.

The processor 210 may be in the form of one or more processors. In some exemplary embodiments, the processor 210 may include one or more hardware processors, such as a microcontroller, a microprocessor, a reduced instruction set computer (RISC), an application specific integrated circuit (ASIC), an application specific instruction set processor (ASIP), a central processing unit (CPU), a graphics processing unit (GPU), a physical processing unit (PPU), a microcontroller unit, a digital signal processor (DSP), a field programmable gate array (FPGA), an advanced RISC machine (ARM), a programmable logic device (PLD), any circuit or processor capable of performing one or more functions, or any combination thereof. Just to illustrate the problem, only one processor 210 is described in the control module 200 in this disclosure. However, it should be noted that the control module 200 in this disclosure may include a plurality of processors 210. Therefore, operations and/or method steps disclosed in this disclosure may be performed by one processor 210 as described in this disclosure, or may be performed jointly by a plurality of processors 210. For example, if the processor 210 of the control module 200 in this disclosure performs step A and step B, it should be understood that step A and step B may also be performed jointly or separately by two different processors 210 (for example, the first processor performs step A, the second processor performs step B, or the first processor and the second processor jointly perform step A and step B).

Figure 8:
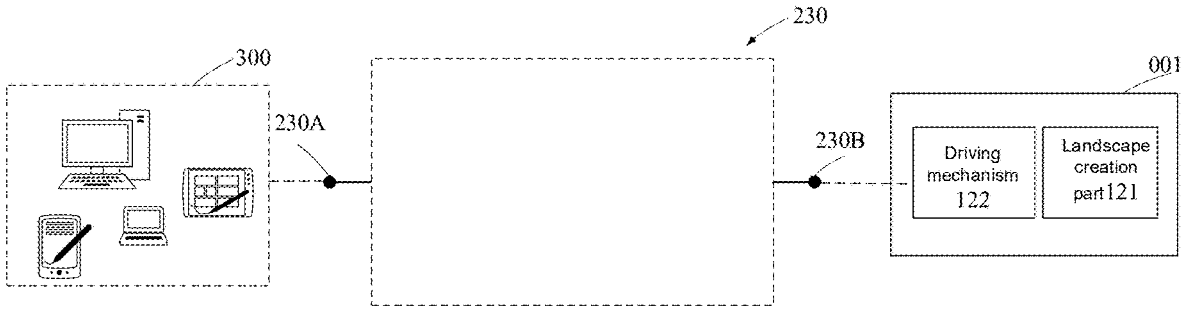
FIG. 8 is a structural schematic diagram of a control circuit provided according to some exemplary embodiments of this disclosure.

In some exemplary embodiments, the control module 200 may include a control circuit 230. For example, the at least one processor 210 and the at least one storage medium 220 may be integrated on the control circuit 230. FIG. 8 is a structural schematic diagram of a control circuit 230. As shown in FIG. 8, the control circuit 230 may include an input end 230A and an output end 230B.

The input end 230A may be configured to, when working, receive a first instruction. The first instruction may correspond to a preset landscape. In some exemplary embodiments, the preset landscape may include a preset building landscape or a preset facility landscape. For example, the preset building landscape may be a music hall, a museum, etc. in a city. For example, the preset facility landscape may be a chair in a park or fitness equipment in the park.

In some exemplary embodiments, the first instruction may be sent by a terminal 300 to the control module 200. As shown in FIG. 8, the terminal 300 may be in communication connection with the control module 200. For example, the terminal 300 may be in wired connection with the control module 200. In another example, the terminal 300 may be in communication with the control module 200 by Bluetooth. In particular, the terminal 300 may be in communication connection with the control circuit 230. The first instruction may be sent by the terminal 300 to the input end 230A.

In some exemplary embodiments, the terminal 300 may be a device capable of interacting with a user. The user can input the data of the preset landscape to the terminal 300 through an input device and an output device of the terminal 300. In some exemplary embodiments, the data of the preset landscape may include a picture of the preset landscape. For example, the user can input a picture of the preset landscape to the terminal 300. The terminal 300 can generate the first instruction based on the picture and thus send the first instruction to the input end 230A. In some exemplary embodiments, the data of the preset landscape may include text data of the preset landscape. The text data may include literal data or digital data. In another example, the user can input height data of the preset landscape to the terminal 300. The terminal 300 may generate the first instruction based on the text data and thus send the first instruction to the input end 230A. In some other embodiments, the first instruction may also be pre-stored in the at least one storage medium 220 of the control module 200. The first instruction received by the control module 200 may be the first instruction received by the control module 200 from the storage medium 220.

In some exemplary embodiments, the terminal 300 may include a mobile device, a tablet computer, a laptop computer, a built-in device in a motor vehicle or the like, or any combination thereof. In some exemplary embodiments, the mobile device may include a smart home device, an intelligent mobile device, a virtual reality device, an augmented reality device or the like, or any combination thereof. In some exemplary embodiments, the smart home device may include a smart TV, a desktop computer, or any combination thereof. In some exemplary embodiments, the smart mobile device may include a smart phone, a personal digital assistance, a game device, a navigation device or the like, or any combination thereof.

The first instruction may be a signal that can be received by the control circuit 230. In some exemplary embodiments, the first instruction may be an electric signal. For example, the first instruction is an analog signal, e.g., a change in current or voltage. In another example, the first instruction may be a digital signal. In some other embodiments, the first instruction may also be an optical signal, an acoustical signal or the like. A specific converter or interface may be disposed on the control circuit 230 to receive the optical signal or the acoustical signal.

In some exemplary embodiments, the first instruction may include one instruction. In some other embodiments, the firs instruction may also include a plurality of instructions. For example, when a plurality of pieces of data is input by the user, a plurality of instructions may be generated from the plurality of pieces of data.

In some exemplary embodiments, the first instruction may include height data of M×N landscape creation parts 121 when M landscape generation modules 100 generate the preset landscape. In some other embodiments, the first instruction may include a preset moving distance of M×N driving elements 122A when M landscape generation modules 100 generate the preset landscape. In some other embodiments, the first instruction may include driving instructions for driving mechanisms 122 of M×N landscape creation parts 121 when M landscape generation modules 100 generate the preset landscape. For example, the first instruction may include driving instructions for motor assemblies 122F of M×N landscape creation parts 121 when M landscape generation modules 100 generate the preset landscape. As described previously, the motor assembly 122F may include a step motor. The first instruction may include rotation angle data of output shafts of M×N step motors. For example, the first instruction may include at least the position data of the landscape creation part 121 driven by the driving mechanism 122, the height data of the landscape creation part 121, and the rotation angle data of the output shaft of the motor.

The output end 230B may be electrically connected with the driving mechanism 122 and configured to, when working, send a second instruction to the corresponding driving mechanism 122. For example, the output end 230B may be electrically connected with the motor assembly 122F of the driving mechanism 122.

The second instruction may be a signal that can be received by the motor assembly 122F. For example, when the motor assembly 122F includes a direct current motor, the second instruction may be a direct current voltage signal. In another example, when the motor assembly 122F includes a servo motor, the second instruction may be an analog signal or a digital signal. In another example, when the motor assembly 122F includes a step motor, the second instruction may be a pulse signal and a direction signal.

The second instruction may be configured to drive a plurality of the driving mechanisms 122. When the first instruction includes the driving instruction for the motor assembly 122F of the landscape creation part 121, the control circuit 230 can directly use the first instruction as the second instruction to drive a plurality of motor assemblies 122F to work, thus causing a plurality of lead screws 122C to rotate and the landscape creation parts 121 to rise or fall. When the first instruction does not include the driving instruction for the motor assembly 122F of the landscape creation part 121, the control circuit 230 can generate the second instruction based on the first instruction. For example, the control circuit 230 can generate the driving instruction for the motor assembly 122F based on the preset moving distance of the driving element 122A, thus causing a plurality of lead screws 122C to rotate and the landscape creation parts 121 to rise or fall.

When all the M×N landscape creation parts 121 are employed to generate the preset landscape, the output end 230B can send the second instruction to M×N driving mechanisms 122. When only some landscape creation parts 121 of the M×N landscape creation parts 121 are employed to generate the preset landscape, the output end 230B can send the second instruction only to the driving mechanisms 122 corresponding to some landscape creation parts 121. When only some landscape creation parts 121 of the M×N landscape creation parts 121 are employed to generate the preset landscape, the output end 230B can also send the second instruction to all the M×N driving mechanisms 122, where the second instruction may instruct that the driving mechanisms 122 corresponding to the landscape creation parts 121 not employed to generate the preset landscape do not work. This disclosure does not impose a limitation on it.

It should be understood that the electrical connection of two ports or two assemblies mentioned in the present disclosure may refer to the direct connection of the two ports or the two assemblies, or may refer to the indirect connection of the two ports or the two assemblies, for example, the two ports or the two assemblies are connected through an intermediate element.

Figure 9A:
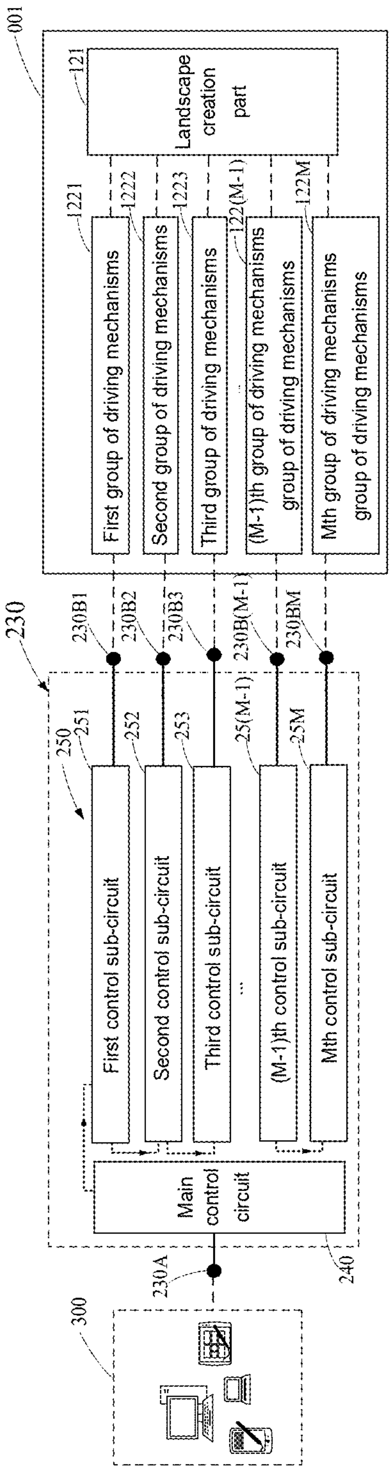
FIG. 9A is a structural schematic diagram of a series connection of control sub-circuits provided according to some exemplary embodiments of this disclosure.

FIG. 9A is a structural schematic diagram of a series connection of control sub-circuits. As shown in FIG. 9A, the control circuit 230 may include a main control circuit 240 and M control sub-circuits 250.

The main control circuit 240 may include an input end 230A. The main control circuit 240 may receive a first instruction.

The M control sub-circuits 250 may be electrically connected in series. The M control sub-circuits 250 may include a first control sub-circuit 251 electrically connected with the main control circuit 240. For ease of description, the M control sub-circuits 250 are named according to a series connection order. As shown in FIG. 9A, the M control sub-circuits 250 may include a first control sub-circuit 251, a second control sub-circuit 252, a third control sub-circuit 253, . . . , an (M−1)th control sub-circuit 25(M−1), and an Mth control sub-circuit 25M. The M control sub-circuits may include an output end 230B. Each control sub-circuit 250 may include one output end. For ease of description, the output end of the first control sub-circuit 251 is denoted as a first output end 230B1, and the output end of the second control sub-circuit 252 as 230B2, . . . , the output end of the (M−1)th control sub-circuit 25(M−1) as 230B (M−1), and the output end of the Mth control sub-circuit 25M as 230BM. The M control sub-circuits 250 may transmit data along an arrow direction indicated by the dotted line.

The M control sub-circuits may correspond to M landscape generation modules 100. For example, the output end 230B of each control sub-circuit 250 of the M control sub-circuits 250 may be connected with the corresponding landscape generation module 100. In particular, the output end 230B of each control sub-circuit 250 may be electrically connected with the corresponding driving mechanism 122. For ease of description, the driving mechanisms 122 electrically connected with the first output end 230B1 are denoted as a first group of driving mechanisms 1221, and the driving mechanisms 122 electrically connected with the second output end 230B2 as a second group of driving mechanisms 1222, . . . , and the driving mechanisms 122 electrically connected with the Mth output end 230BM as an Mth group of driving mechanisms 122*m*. An ith group of driving mechanisms 122*i* includes N driving mechanisms 122, where 1≤i≤M.

As shown in FIG. 9A, the first output end 230B1 of the first control sub-circuit 251 may be electrically connected with the first group of driving mechanisms 1221. The Mth output end 230BM of the Mth control sub-circuit 25M may be electrically connected with the Mth group of driving mechanisms 122*m*.

The M control sub-circuits are configured such that when working, the first control sub-circuit 251 receives the first instruction and sequentially sends the first instruction to a target control sub-circuit. As described previously, the first instruction may include the driving instruction for the driving mechanism 122 corresponding to the preset landscape. For ease of description, the driving mechanism 122 corresponding to the preset landscape is denoted as a target driving mechanism.

The target control sub-circuit may be a control sub-circuit 250 for sending the driving instruction to the target driving mechanism. The target control sub-circuit may convert the first instruction into a second instruction to drive a plurality of the driving mechanisms 122.

For example, to generate the preset landscape, the third group of driving mechanisms 1223 needs to work. The target control sub-circuit is the third control sub-circuit 253. After receiving the first instruction, the main control circuit 240 can send the first instruction to the first control sub-circuit 251. The first control sub-circuit 251 will send the first instruction to the second control sub-circuit 252. The second control sub-circuit 252 will continue sending the first instruction to the third control sub-circuit 253. At this point, the transmission of the first instruction is stopped, and the third control sub-circuit 253 can convert the first instruction into the second instruction to drive the third group of driving mechanisms 1223 to work.

As described previously, the ith group of driving mechanisms 122*i* may include N driving mechanisms 122. Therefore, for example, the first instruction may include the driving instruction for the jth driving mechanism of each group of driving mechanisms, where 1≤j≤N. For example, the first instruction may include the driving instruction for the 3rd driving mechanism of the fifth group of driving mechanisms to drive the corresponding lead screw 122C to rotate, thereby driving the 5th landscape creation part 121 to rise or fall. Further, the first instruction may include the driving instruction for the motor assembly 122F in the jth driving mechanism of each group of driving mechanisms. For example, the first instruction may include a rotation angle of the step motor in the 3rd driving mechanism in the fifth group of driving mechanisms to drive the corresponding lead screw 122C to rotate, thereby causing the 5th landscape creation part 121 to rise or fall. For example, the first instruction may include the driving instruction for each driving mechanism of each group of driving mechanisms. For example, each group of driving mechanisms includes 20 driving mechanisms 122, i.e., includes 20 motor assemblies 122F. The first instruction includes the driving instruction for the 20 motors.

In another example, to generate the preset landscape, the sixth group of driving mechanisms and the eighth group of driving mechanisms need to work. The target control sub-circuit is the sixth control sub-circuit and the eighth control sub-circuit. After receiving the first instruction, the main control circuit 240 can send the first instruction to the first control sub-circuit 251. The first instruction is sequentially transmitted according to the series connection order of the control sub-circuits 250 to the sixth control sub-circuit, and the sixth control sub-circuit can generate a second instruction based on the first instruction to drive the sixth group of driving mechanisms to work. The first instruction is continuously transmitted to the eighth control sub-circuit. The eighth control sub-circuit can generate the second instruction based on the first instruction to drive the eighth group of driving mechanisms 1228 to work. At this point, the transmission of the first instruction is stopped.

It needs to be noted that the first instruction in the transmission process might be parsed or converted and the content included in the first instruction might change. Instructions in the process from being received by the main control circuit 240 to being received by the target control sub-circuit may all be called the first instruction.

Figure 9B:
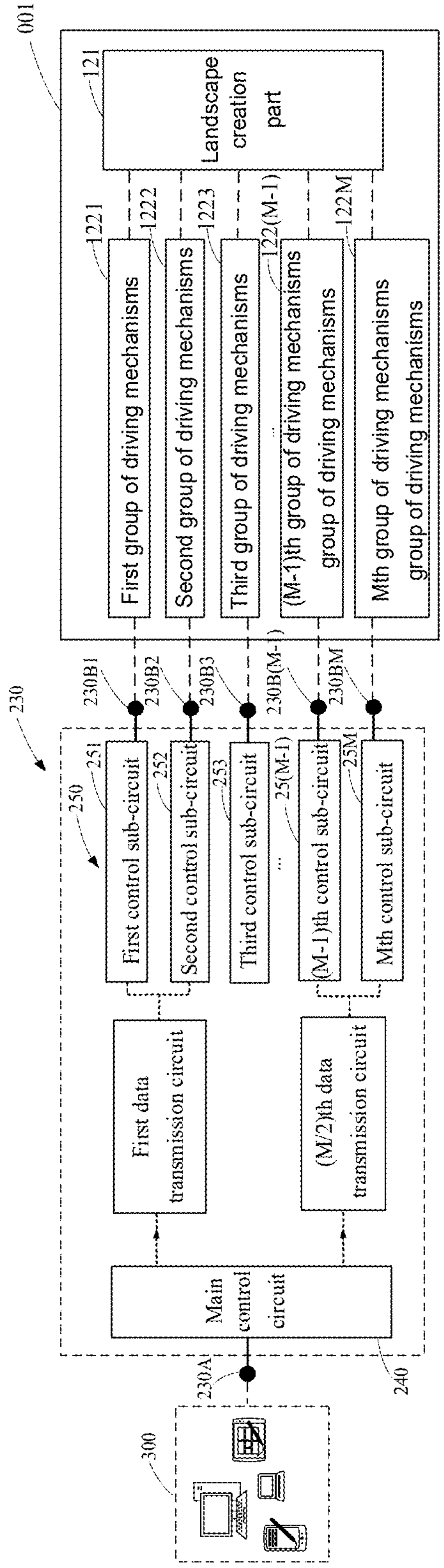
FIG. 9B is a structural schematic diagram of a parallel connection of control sub-circuits provided according to some exemplary embodiments of this disclosure.

FIG. 9B is a structural schematic diagram of a parallel connection of control sub-circuits. As shown in FIG. 9B, the control circuit 230 may include a main control circuit 240, M control sub-circuits 250, and W data distribution circuits 260.

The main control circuit 240 may include an input end 230A. The main control circuit 240 may receive a first instruction.

The M control sub-circuits may be electrically connected in parallel. The M control sub-circuits 250 may correspond to M landscape generation modules 100. For the specific corresponding manner, a reference may be made to the above, which will not be described redundantly here in this disclosure.

The W data distribution circuits 260 can be electrically connected with the main control circuit 240 and the M control sub-circuits 250, respectively. M may be a multiple of W. For example, the control circuit 230 includes 4 data distribution circuits, and 20 control sub-circuits 250. M may also not be a multiple of W. For example, the control circuit 230 includes 4 data distribution circuits, and 19 control sub-circuits 250. In some exemplary embodiments, each data distribution circuit 260 can be electrically connected with the same number of control sub-circuits 250. For example, as shown in FIG. 9B, each data distribution circuit 260 can be electrically connected with 2 control sub-circuits 250. In another example, each data distribution circuit 260 can be electrically connected with 5 control sub-circuits 250. In some other embodiments, the control sub-circuits 250 connected to each data distribution circuit 260 may also be different. For example, one data distribution circuit 260 is connected with 4 control sub-circuits 250, and another data distribution circuit 260 is connected with 5 control sub-circuits 250.

After receiving the first instruction, the main control circuit 240 can send the first instruction to the W data distribution circuits 260, and the first instruction is then sent by the W data distribution circuits 260 to part of control sub-circuits 250. The M control sub-circuits may include an output end 230B. The output end 230B may be electrically connected with the corresponding driving mechanism 122.

In some exemplary embodiments, after the W data distribution circuits 260 receive the first instruction, the first instruction can be sent to each data distribution circuit 260. Each data distribution circuit 260 may then send the first instruction to the correspondingly connected control sub-circuit 250. The M control sub-circuits 250 may control the corresponding driving mechanisms 122 to work or not to work based on the first instruction or the parsed first instruction. For example, as shown in FIG. 9B, to generate the preset landscape, the sixth group of driving mechanisms needs to work, and the main control circuit 240 may send the first instruction to M/2 data distribution circuits 260, and the M/2 data distribution circuits 260 may then send the first instruction to the M control sub-circuits 250. The sixth control sub-circuit electrically connected with the sixth group of driving mechanisms responds after receiving the first instruction. For example, the sixth control sub-circuit may generate the second instruction based on the first instruction to control the sixth group of driving mechanisms to work.

In some other embodiments, the W data distribution circuits 260 can be configured to, when working, receive the first instruction, and select at least one target control sub-circuit from the M control sub-circuits 250 and send the first instruction to the at least one target control sub-circuit. The at least one target control sub-circuit can convert the first instruction into the second instruction to drive a plurality of the driving mechanisms 122. For ease of description, the data distribution circuit corresponding to the target control sub-circuit is denoted as a target distribution circuit.

The first instruction can be sent to the target control sub-circuit corresponding to the target driving mechanism. The W data distribution circuits 260 can obtain port data of the target control sub-circuit from the first instruction and thus only send the first instruction to the target control sub-circuit. The target control sub-circuit can generate the second instruction based on the first instruction to control the corresponding driving mechanism 122 to work. For example, as shown in FIG. 9B, to generate the preset landscape, the sixth group of driving mechanisms needs to work, and the target control sub-circuit is the sixth control sub-circuit. The main control circuit 240 can send the first instruction to the M/2 data distribution circuits 260. The target distribution circuit can be determined from the M/2 data distribution circuits 260 based on the first instruction, and then the first instruction is transmitted by the target distribution circuit to the target control sub-circuit. The target control sub-circuit can convert the first instruction into the second instruction to drive the sixth group of driving mechanisms.

In some other embodiments, the connection relationship between the data distribution circuit 260 and the control sub-circuit 250 can be pre-stored in the terminal 300 or in the storage medium of the main control circuit 240. Alternatively, the connection relationship between the data distribution circuit 260 and the control sub-circuit 250 can be included in the first instruction, and the main control circuit 240 can receive the connection relationship after parsing the first instruction. Therefore, the main control circuit 240 can transmit the first instruction only to the target distribution circuit corresponding to the target control sub-circuit, and the first instruction is then transmitted by the target distribution circuit to the target control sub-circuit such that the data transmission between circuits is reduced, thereby reducing the power consumption of the circuits, reducing the risk that the data has an error or is tampered in transmission, and improving the reliability of data transmission; and the bandwidth can be utilized more effectively, and the overall performance of the circuit is improved.

In some exemplary embodiments, a controller area network (CAN) communication protocol can be used for the data in the transmission process by the circuits. The CAN communication protocol has the advantages of strong error detection capability, supporting a plurality of data rates, ease of implementation, and high data transmission efficiency, etc.

Since the data transmission is implemented using the above-mentioned multi-stage circuit form, the time taken for the data transmission can be saved such that the driving mechanism 122 responds timely and the landscape creation parts 121 generate the preset landscape more smoothly. For example, assuming that the data transmission time between every two circuits is t, when the sixth group of driving mechanisms needs to work and the circuit of FIG. 9A is used, the transmission of the first instruction between the circuits takes 6t. When the circuit shown in FIG. 9B is used, due to parallel data transmission, the transmission of the first instruction between the circuits takes only 2t. This greatly shortens the time required for data transmission such that the driving mechanism 122 responds more timely and the landscape creation parts 121 generate the preset landscape more smoothly.

How the control module 200 controls M landscape generation modules 100 to generate the preset landscape is described in detail below with reference to the drawings.

Figure 10:
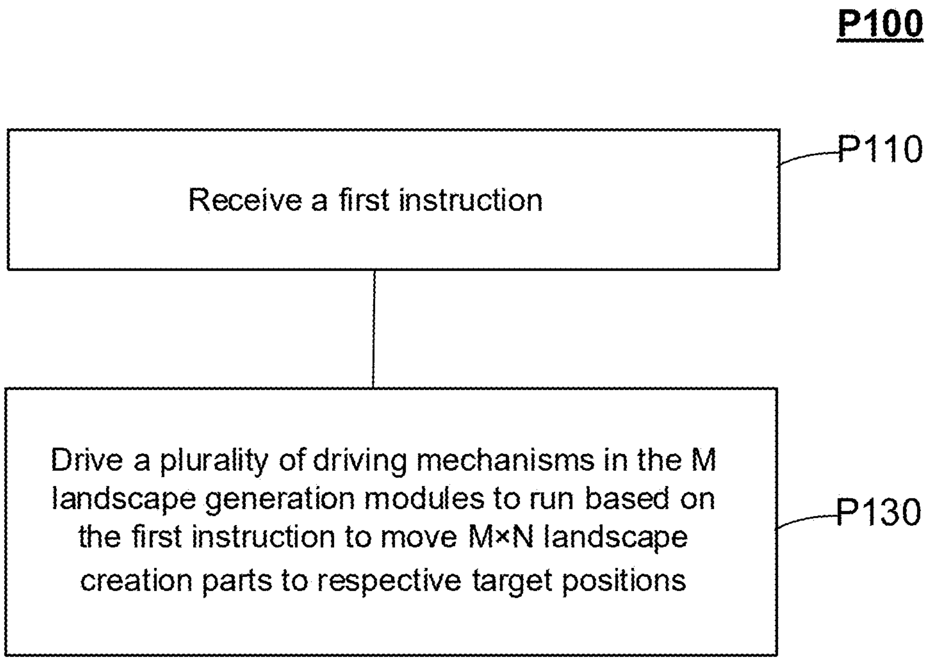
FIG. 10 is a flowchart of a step performed when a control module works provided according to some exemplary embodiments of this disclosure.

FIG. 10 is a flowchart of step P100 performed when the control module 200 works. The processor 210 can perform step P100. Step P100 as shown in FIG. 10 may include the following steps.

In step P110, the first instruction is received.

In some exemplary embodiments, the main control circuit 240 can receive the first instruction.

In step P130, a plurality of the driving mechanisms 122 in the M landscape generation modules 100 are driven to run based on the first instruction to move M×N landscape creation parts 121 to respective target positions.

In some exemplary embodiments, the main control circuit 240 can transmit the first instruction to the target control sub-circuit. The target control sub-circuit can generate the second instruction based on the first instruction to drive the driving mechanism 122 to run to move the landscape creation part 121 to the target position, generating the preset landscape.

In some exemplary embodiments, the driving mechanism 122 includes the motor assembly 122F. The moving the M×N landscape creation parts to respective target positions, for each landscape creation part 121, may include the following step: the motor is controlled to rotate the lead screw 122C such that the landscape creation part 121 reaches the target position.

FIG. 11A to FIG. 11D illustrate structural schematic diagrams of different preset landscapes generated by a plurality of landscape generation modules 100 provided according to some exemplary embodiments of this disclosure.

Figure 11A:
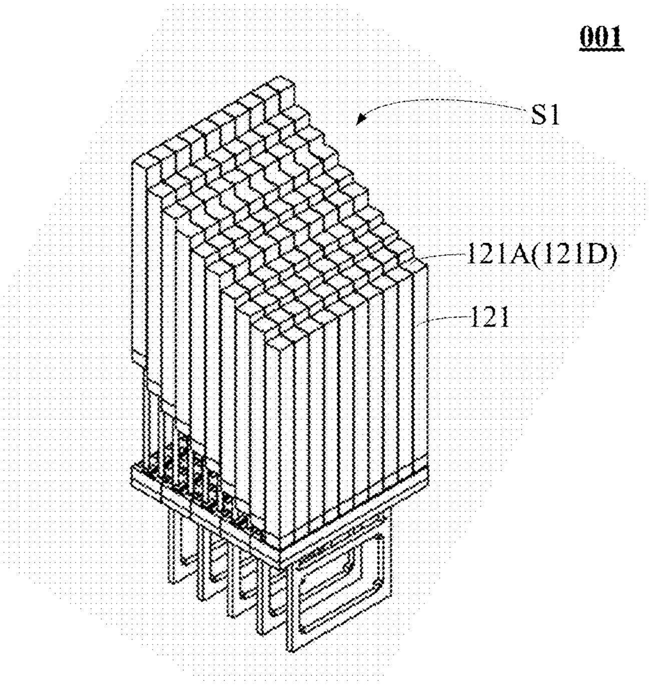
FIG. 11A is a structural schematic diagram of generating a preset landscape by a plurality of landscape generation modules provided according to some exemplary embodiments of this disclosure.

As shown in FIG. 11A, the preset landscape may be a slope S1. The landscape creation parts 121 rise sequentially to exhibit the topographic characteristics that the slope has.

Figure 11B:
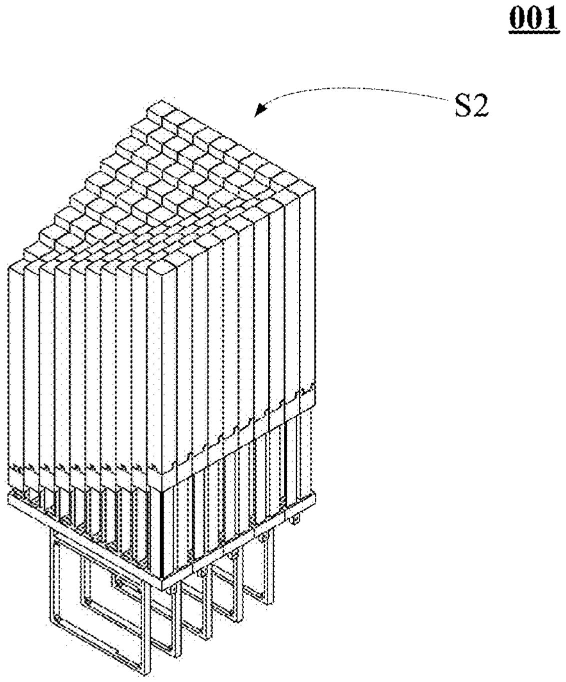
FIG. 11B is a structural schematic diagram of generating another preset landscape by a plurality of landscape generation modules provided according to some exemplary embodiments of this disclosure.

As shown in FIG. 11B, the preset landscape may be a structurally distinctive art museum S2 in a city.

Figure 11C:
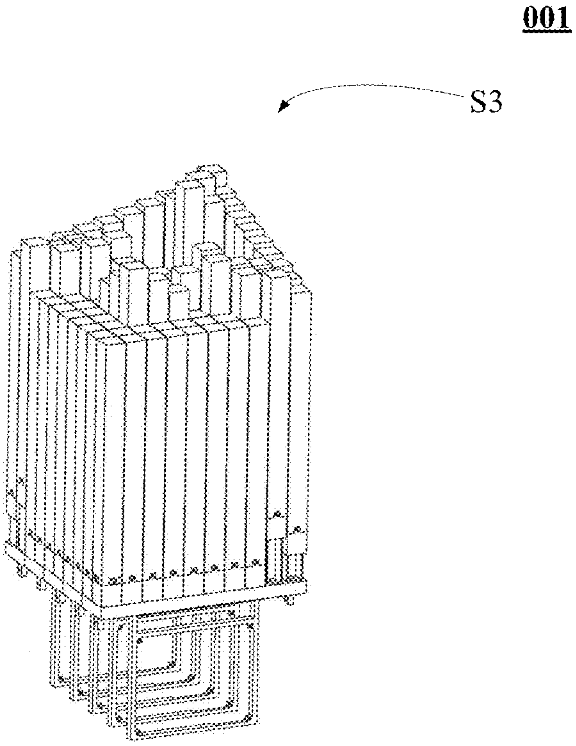
FIG. 11C is a structural schematic diagram of generating still another preset landscape by a plurality of landscape generation modules provided according to some exemplary embodiments of this disclosure.

As shown in FIG. 11C, the preset landscape may be a music square. The music square may include a music hall and a surrounding facility S3.

Figure 11D:
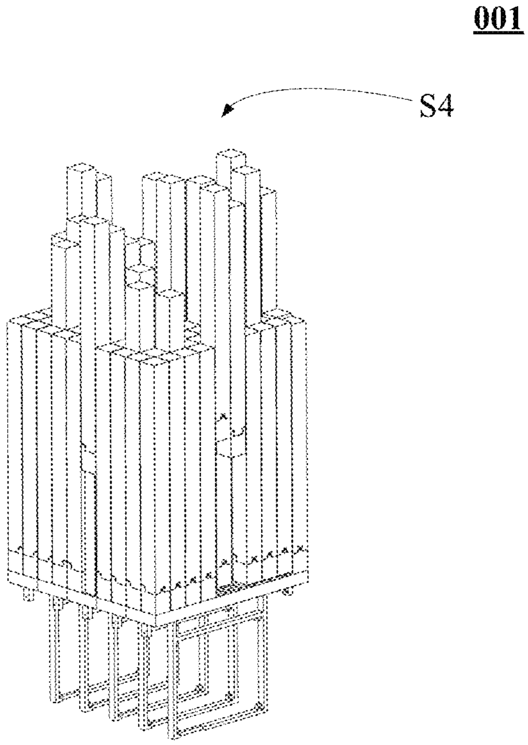
FIG. 11D is a structural schematic diagram of generating yet another preset landscape by a plurality of landscape generation modules provided according to some exemplary embodiments of this disclosure.

As shown in FIG. 11D, the preset landscape may be a plurality of towering office buildings S4 in a region in a city.

In some exemplary embodiments, the preset landscape may be a dynamic landscape, and correspondingly, the target position changes over time. For example, the preset landscape is a sea level within a period of time. Since the sea level changes dynamically, the preset landscape is the dynamic landscape. For each landscape creation part 121, the corresponding target position changes over time. The landscape creation part 121 can undergo processes of rising, falling, and then rising over time, thus rendering the generated preset landscape more realistic. In another example, the preset landscape may be a bridge under different tidal phenomena. During a rising tide, part of the bridge is flooded, and part of the bridge is presented. During a falling tide, the bridge is completely presented. In another example, the dynamic landscape is switching between two preset landscapes. That is, a first preset landscape is firstly generated by the landscape creation part 121 from an initialized state; the first preset landscape is then changed into a second preset landscape, and the second preset landscape is then changed into a third preset landscape, and so on.

When the preset landscape is the dynamic landscape, the first instruction may include a plurality of target positions of each landscape creation part 121 in at least one landscape generation module 100. The plurality of target positions may include at least a first position and a second position. The first position is at a first distance from the base frame 110, and the second position is at a second distance from the base frame 110. For example, the dynamic landscape is switching between the above-mentioned two preset landscapes. The first instruction may include a position where the first preset landscape is generated and a position where the second preset landscape is generated by each landscape creation part 121.

Figure 12:
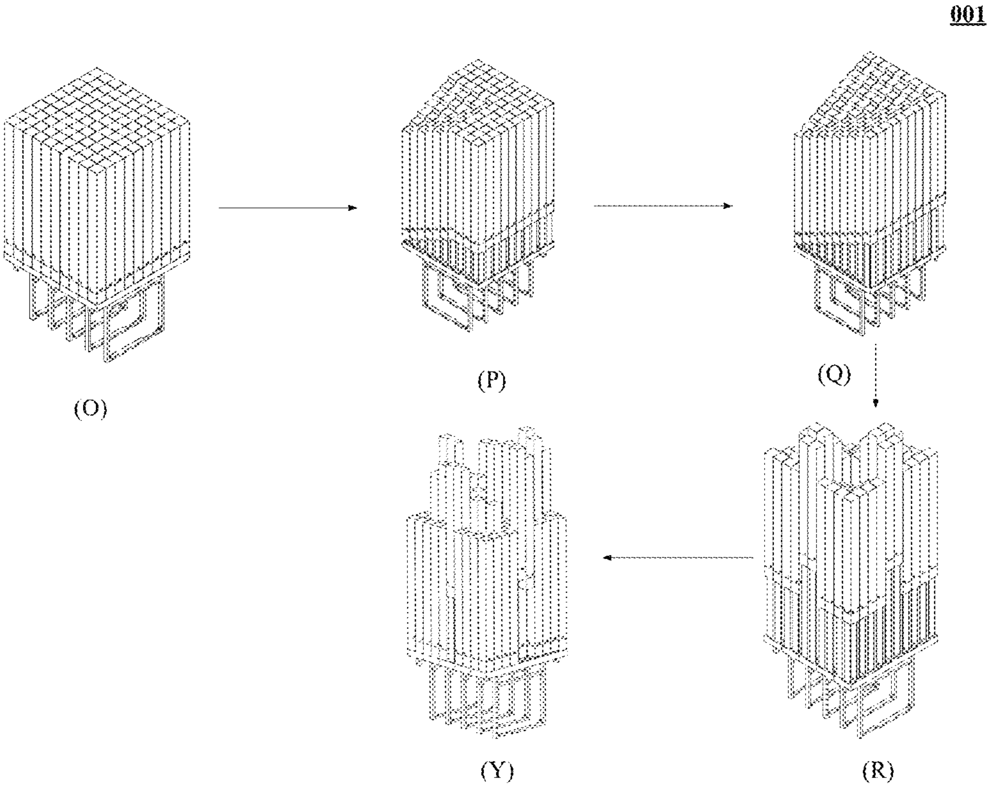
FIG. 12 is a schematic diagram of switching between two preset landscapes provided according to some exemplary embodiments of this disclosure.

FIG. 12 is a schematic diagram of switching between two preset landscapes. FIG. 12 includes a diagram illustrating states of five landscape creation parts 121 in the switching process. FIG. 12 shows, along the arrow direction, the landscape creation part 121(O) in an initial state, the landscape creation part 121(P) in the process of generating the first preset landscape, the landscape creation part 121(Q) when the first preset landscape is completely generated, the landscape creation part 121(R) in the process of changing from the first preset landscape to the second preset landscape, and the landscape creation part 121(Y) when the second preset landscape is generated.

As described previously, the landscape creation parts 121 can exhibit different heights in a landscape creation direction (target direction) by moving in the landscape creation direction. Thus, at least the undulating state that the preset landscape has can be presented. In order to better present the preset landscape, in some exemplary embodiments, as shown in FIG. 11A, the landscape creation part 121 further includes a pattern display part 121D to simulate an environmental element of the preset landscape. The environmental element may be a vegetation coverage in the preset landscape, or may be the presence of animals in the preset landscape, and so on. The pattern display part 121D may be a region on the landscape creation part 121 that can be observed by the user's eyes. As shown in FIG. 11A, the pattern display part 121D may include the end face 121A of the landscape creation part 121. In another example, the pattern display part 121D may further include a side face region of the landscape creation part 121.

The following description is made by taking the preset landscape being a raised prairie land in a golf course as an example. In addition to being capable of simulating the undulation of the topography of the prairie land by the landscape creation parts 121, the landscape generation module 100 can also display the green color of the grassland and the sparse or dense distribution of the grassland on the pattern display part 121D, rendering the preset landscape closer to the real landscape and more realistic. A pattern displayed on the pattern display part 121D may be obtained by painting or by paint spraying, etc. In some other embodiments, the landscape creation part 121 may be an electronic display screen, e.g., a light emitting diode (LED) display screen. The pattern display part 121D is also an electronic display screen. By using the electronic display screens having the display function as the landscape creation part 121 and the pattern display part 121D, not only can the environmental elements of the preset landscape be generated, but also different preset landscapes can be generated without replacing the landscape creation part 121.

In some exemplary embodiments, the landscape generation module 100 further includes a flexible cover. The flexible cover may cover the landscape creation part 121, e.g., the end face 121A of the landscape creation part 121. When each landscape generation module 100 reaches the target position, the flexible cover may be combined with the landscape creation parts 121 to form the preset landscape. The flexible cover may be cloth capable of exhibiting environmental characteristics. The following description is made by taking the preset landscape being a raised prairie land in a golf course as an example. The landscape creation parts 121 can simulate the topography of the prairie land, and the flexible cover can simulate grass on the prairie land. For example, the flexible cover may be green cloth similar to the color of the grassland. In another example, the flexible cover may include a fiber material for simulating the appearance and touch of the turf on the prairie land, or the like.

In some other embodiments, the user can project a pattern on the landscape creation part 121, e.g., on the end face 121A, thereby simulating the environmental elements of the preset landscape. Therefore, the landscape creation part 121 may be a color prone to projection. For example, the end face 121A of the landscape creation part 121 is white. The user can project the green lawn on the end face 121A such that the generated preset landscape is closer to the lawn of the golf course, rendering the generated preset landscape more realistic.

Figure 13:
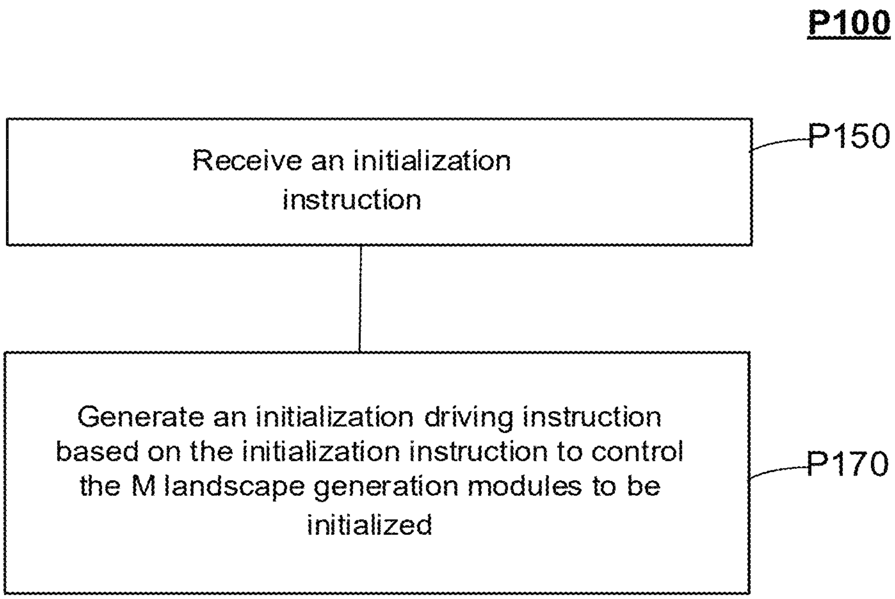
FIG. 13 is a schematic diagram of other flows in a step performed when a control module works provided according to some exemplary embodiments of this disclosure.

FIG. 13 is a schematic diagram of other flows in step P100 when the control module works. As shown in FIG. 12, step P100 may further include the following steps.

In step P150, an initialization instruction is received.

The initialization instruction may include an instruction for initializing at least part of M×N landscape creation parts 121. The initialization may be allowing M×N landscape creation parts 121 to be located at the same height. For example, the M×N landscape creation parts 121 are each located at the highest point of the preset interval. In another example, the M×N landscape creation parts 121 are each located at the lowest point of the preset interval. In some exemplary embodiments, when the initialization is to locate the landscape creation part 121 at the lowest point, the initialization instruction may include only an instruction for the landscape creation part 121 not at the lowest point in the preset interval, thereby reducing data transmission. In some other embodiments, when the initialization is to locate all the landscape creation parts 121 at the lowest point, the initialization instruction may include an instruction for all the landscape creation parts 121, thus guaranteeing that the height of each landscape creation part 121 is calibrated and making the generated preset landscape more accurate.

In some exemplary embodiments, the main control circuit 240 may receive the initialization instruction.

In step P170, an initialization driving instruction is generated based on the initialization instruction to control M landscape generation modules 100 to be initialized.

In some exemplary embodiments, the main control circuit 240 may transmit a third instruction to the control subcircuit 250 corresponding to the landscape creation part 121 needing to be initialized. The control sub-circuit 250 may generate the initialization driving instruction based on the initialization instruction to control the M landscape generation modules 100 to be initialized.

The above step may occur prior to generating different preset landscapes each time, or may occur after generating the preset landscape such that the landscape generation system 001 recovers the initial state.

As described previously, each telescopic unit 120 may further include the limit switch. For example, each telescopic unit 120 may include the first switch mounted on the first base 111. In order to control the M landscape generation modules 100 to be initialized, the control module 200, when working, can perform: sending a rotation signal to the motor assembly 122F of each telescopic unit 120 and driving the motor assembly 122F to rotate the lead screw 122C until the driving element 122A triggers the first switch. The first switch is disposed on the first base 111, and therefore, the initialization instruction may be causing all the M×N landscape creation parts 121 to be located at the lowest point of the preset interval.

In some exemplary embodiments, the first switch can be connected with the motor assembly 122F. When the driving element 122A triggers the first switch, the first switch can turn off the motor assembly 122F so that it cannot work. In some other embodiments, when the driving element 122A triggers the first switch, the control module 200 can stop sending the driving instruction to the driving mechanism 122.

In some exemplary embodiments, the landscape generation system 001 may further include a temperature sensor and a cooler. The temperature sensor can be in communication connection with the control module 200 and configured to detect the temperature of a preset region in the landscape generation module 100. The preset region may be the space where the landscape generation module 100 is located, a surface of a circuit board of the control circuit 230, or a surface of the motor assembly 122F in the driving mechanism 122. The cooler can be configured to, when working, reduce the temperature of the preset region. For example, the cooler may be a water cooling device. The preset region is cooled with cold water. In another example, the cooler may also be an air conditioner. The ambient temperature of the preset region is directly reduced by the air conditioner, thus cooling the preset region. In another example, the cooler may be an air blasting device. The preset region is cooled with cold air. In some exemplary embodiments, the landscape generation system 001 may further include a plurality of air blasting devices. For example, the landscape generation system 001 includes one air blasting device and one air drawing device so that the preset region can be cooled and heat can be blown out of the system timely. The above-mentioned any combination of coolers can be selected to cool the preset region. The control module 200, when working, may further perform: obtaining temperature data of the temperature sensor; and determining that the temperature data exceeds a first threshold, and controlling the cooler to work to cool the preset region. The first threshold may be an exact numerical value, or may be a numerical range. The first threshold may be set by a worker or a user according to experience. For example, the first threshold may be obtained based on guaranteeing safe running of the motor and not affecting the mechanical properties of the motor.

Figure 14:
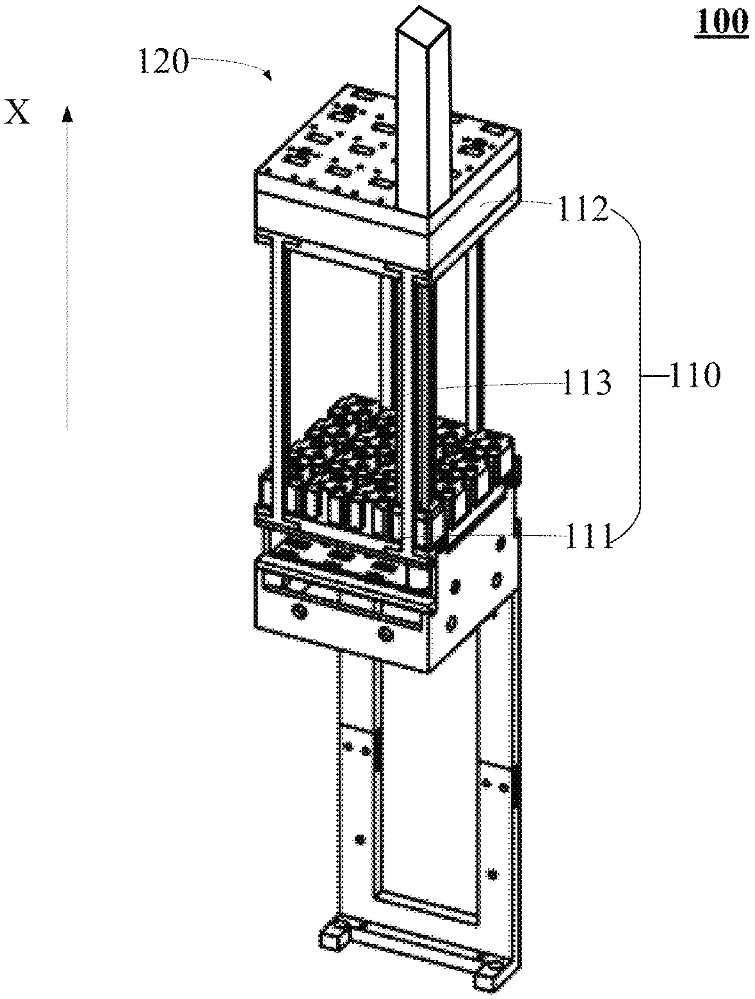
FIG. 14 is a structural schematic diagram of another single landscape generation module provided according to some exemplary embodiments of this disclosure.

FIG. 14 is a structural schematic diagram of another single landscape generation module 100 provided according to this disclosure. In the landscape generation module 100 shown in FIG. 14, 16 telescopic units 120 (N=16) are arranged in a 4×4 array. For ease of showing, FIG. 14 is only part of structure of the telescopic unit 120.

As described previously, in addition to the first base 111, the base frame 110 may further include the second base 112, thereby forming the two-layer structure shown in FIG. 14. Moreover, the base frame 110 further includes a support 113 to connect the first base 111 and the second base 112. There are a plurality of ways to realize connection of the first base 111, the second base 112, and the support 113, such as integrated molding, threaded connection, welding, adhesive bonding, snap-fit connection, and mortise-and-tenon connection, which will not be defined here in this disclosure. The support 113 may be of a structure such as a support rod, a support pillar, or a support block, which will not be defined here in this disclosure. For example, the first base 111 and the second base 112 are rectangular in FIG. 14, and the number of supports 113 is 4. A direction in which the support 113 extends may be the target direction, denoted as the X-axis. The first base 111 and the second base 112 may be distributed at an interval along the X-axis direction.

Figure 15:
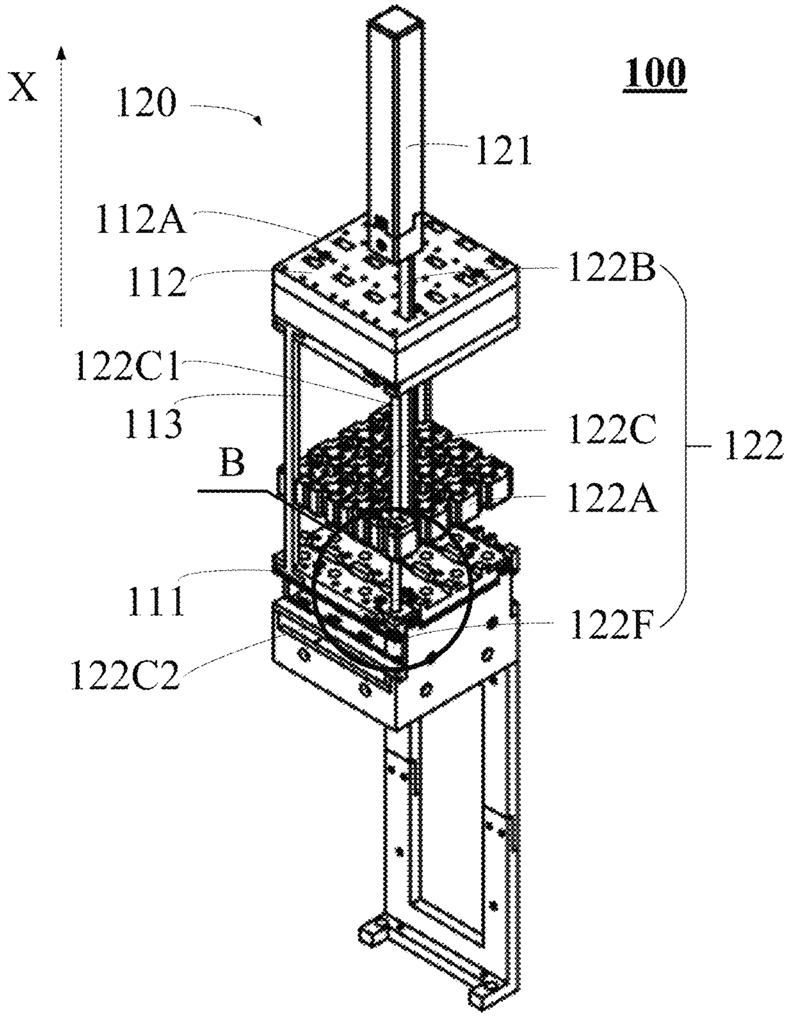
FIG. 15 is a structural schematic diagram of a telescopic unit provided according to some exemplary embodiments of this disclosure.

FIG. 15 is a structural schematic diagram of one telescopic unit 120. As shown in FIG. 15, the driving mechanism 122 may include a driving element 122A, a connecting rod 122B, and a lead screw 122C. As shown in FIG. 15, the lead screw 122C may be disposed along the target direction. The lead screw 122C includes a first end 122C1 and a second end 122C2. The first end 122C1 may be connected with the second base 112. The second end 122C2 may be connected with the first base 111. As shown in FIG. 15, holes for the lead screw 122C to pass through may be formed in the first base 111 and the second base 112. The driving element 122A may be in threaded connection with the lead screw 122C. Therefore, the rotation of the lead screw 122C can be converted into rectilinear motion through the screw thread such that the driving element 122A moves between the first base 111 and the second base 112. Since the lead screw is employed for transmission, the structure is simple, the cost is low, and the positioning accuracy is high.

Since the driving element 122A is located between the first base 111 and the second base 112 and the landscape creation part 121 is located at a side of the second base 112 away from the first base 111, the driving mechanism 122 further includes the connecting rod 122B to connect the driving element 122A with the landscape creation part 121. As shown in FIG. 15, the second base 112 includes a first hole 112A. The connecting rod 122B slidably passes through the first hole 112A to connect the driving element 122A with the landscape creation part 121. The connecting rod 122B can form the guide pillar-guide sleeve structure with the first hole 112A of the second base 112 so that the driving element 122A can drive the landscape creation part 121 to move by means of the connecting rod 122B and also can provide guidance through the first hole 112A. A shape of the first hole 112A may be adapted to a shape of the connecting rod 122B to limit the motion of the connecting rod 122B in other directions than the target direction, thus making the motion of the landscape creation part 121 more stable.

In some exemplary embodiments, the connecting rod 122B may be connected with one end of the landscape creation part 121. In some other embodiments, the connecting rod 122B may also partly pass through the interior of the landscape creation part 121 and thus is not prone to breakage, and its connection with the landscape creation part 121 is more stable.

Therefore, when the driving mechanism 122 works, the driving element 122A drives the connecting rod 122B to move, thereby driving the landscape creation part 121 to move. As described previously, in order to realize self-locking of the driving mechanism 122, the lift angle of the screw thread of the lead screw 122C is less than the frictional angle of threaded connection between the lead screw 122C and the driving element 122A.

Figure 16:
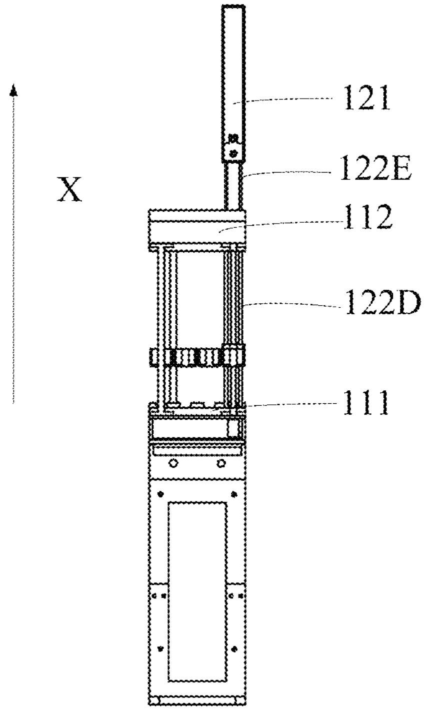
FIG. 16 is a structural schematic diagram of a guide rail provided according to some exemplary embodiments of this disclosure.

In some exemplary embodiments, the driving mechanism 122 further includes a guide rail 122D. FIG. 16 is a structural diagram of a guide rail. For ease of showing the guide rail 122D, the connecting rod 122B is hidden in FIG. 16. For ease of description, the guide rail 122D is named as a first guide rail 122D.

The first guide rail 122D may be disposed along the target direction. The first guide rail 122D may be slidably connected with the driving element 122A and fixedly connected with the first base 111 and the second base 112. Referring back to FIG. 15, holes for the first guide rail 122D to pass through may be formed in the first base 111 and the second base 112. The first guide rail 122D can support and guide the driving element 122A to move rectilinearly in a given direction (the target direction) and to prevent rotation thereof. In some exemplary embodiments, the first guide rail 122D may include one guide pillar. In some other embodiments, the first guide rail 122D may include two guide pillars such that the driving element 122A moves more stably.

Since the landscape creation part 121 is a long and narrow prism, when the driving element 122A drives the landscape creation part 121 to move, especially move to be close to the highest point of the preset interval, the top end thereof may shake due to no limitation. Therefore, in order to improve the stability of the landscape creation part 121 when moving, in some exemplary embodiments, the driving mechanism further includes a second guide rail 122E. The landscape creation part 121 may move along the second guide rail 122E. As shown in FIG. 16, one end of the second guide rail 122E is connected with the second base 112. A hole for the second guide rail 122E to pass through may be formed in the second base 112. The landscape creation part 121 may include a guide hole such that the second guide rail 122E passes through the guide hole to form the guide pillar-guide sleeve structure. In some exemplary embodiments, the cross section of the second guide rail 122E may be non-circular to prevent rotation. For example, the cross section is U-shaped. By using the U-shaped second guide rail 122E, the landscape creation part 121 can be better prevented from rotation such that its motion is more stable. Correspondingly, the hole for the second guide rail 122E to pass through in the first base 111 may also be U-shaped.

Therefore, when the driving mechanism 122 works, the driving element 122A moves along the first guide rail 122D to drive the connecting rod 122B to move, thus driving the landscape creation part 121 to move along the second guide rail 122E. The second guide rail 122E may be a portion of the first guide rail 122D that extends out of the second base 112. That is, the second guide rail 122E and the first guide rail 122D are one rail. The second guide rail 122E and the first guide rail 122D may also be different rails, and the two rails are disposed at an interval on the second base 112. A length of the second guide rail 122E is equal to the length of the preset interval. A length of the first guide rail 122D is greater than or equal to the length of the second guide rail 122E so that the landscape creation part 121 can move to two endpoints of the preset interval.

The driving mechanism 122 may further include the motor assembly 122F. The specific structure of the motor assembly 122F has been described previously, which will not be described redundantly here. In some exemplary embodiments, a straight groove may be formed in the second end 122C2 of the lead screw 122C to cooperate with the double-flat position shaft of the motor in the motor assembly 122F. A bearing may also be mounted at the position where the two cooperate to prevent the lead screw from shaking.

For a method of the control module 200 controlling the landscape generation module 100 shown in FIG. 13 to generate the preset landscape, a reference can be made to the foregoing descriptions, which will not be described here redundantly.

Figure 17:
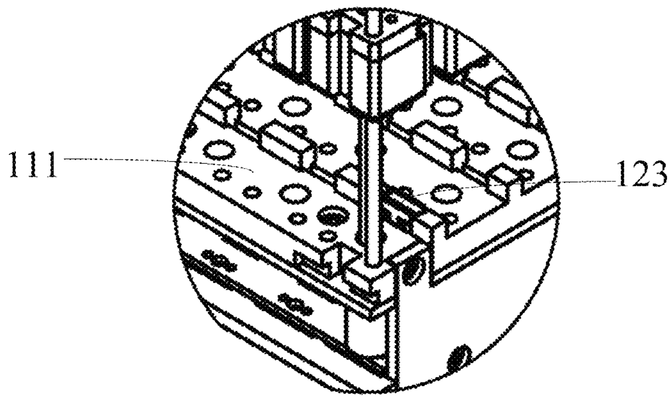
FIG. 17 is a partially enlarged diagram of the telescopic unit shown in FIG. 15 at a first base according to this disclosure.

As described previously, each telescopic unit 120 may further include the limit switch, e.g., the first switch disposed on the first base 111. FIG. 17 is a partially enlarged diagram of the telescopic unit 120 shown in FIG. 15 in this disclosure at the first base 111, to show the setup of the first switch 123. As shown in FIG. 17, the first switch 123 may be disposed on a side of the first base 111 facing the driving element 122A. A clamping groove for mounting the first switch 123 may be formed in the first base 111. When the driving element 122A moves along the backward direction of the X-axis, the height of the landscape creation part 121 is reduced. When the driving element 122A continues to move along the backward direction of the X-axis to come into contact with the first switch 123, i.e., contact with the first base 111, there is no space for the driving element 122A to move and the landscape creation part 121 moves to the lowest point of the preset interval. At this point, the driving mechanism 122 does not need to continue driving the driving element 122A to move, there is no need for continuing driving the lead screw 122C to rotate. Therefore, the driving element 122A touching the first switch 123 may be regarded as a signal for stopping the driving mechanism 122 from driving the lead screw 122C to rotate. For example, the first switch 123 may control the motor assembly 122F to stop rotating, thus stopping the lead screw 122C from rotating and saving energy.

The base frame 110 may include the first base 111 and the second base 112. Therefore, in some exemplary embodiments, each telescopic unit 120 may further include a second limit switch.

The second switch may be disposed on the second base 112 and be in communication connection with at least one of the driving mechanism 122 or the control module 200. The second switch may be disposed in the moving path of the driving element 122A. When the driving element 122A triggers the second switch during moving, the second switch may control the driving mechanism 122 to stop working. For example, the second switch can control the driving mechanism 122 to stop driving the lead screw 122C to rotate. In particular, the second switch may be disposed on a side of the second base 112 facing the driving element 122A. A clamping groove for mounting the second switch may be formed in the second base 112. When the driving element 122A moves along the forward direction of the X-axis, the height of the landscape creation part 121 is increased. When the driving element 122A continues to move along the forward direction of the X-axis to come into contact with the second switch, i.e., contact with the second base 112, there is no space for the driving element 122A to move and the landscape creation part 121 moves to the highest point of the preset interval. At this point, the driving mechanism 122 does not need to continue driving the driving element 122A to move, there is no need for continuing driving the lead screw 122C to rotate. Therefore, the driving element 122A touching the second switch may be regarded as a signal for stopping the driving mechanism 122 from driving the lead screw 122C to rotate. For example, the second switch may control the motor assembly 122F to stop rotating, thus stopping the lead screw 122C from rotating and saving energy.

In some exemplary embodiments, each telescopic unit 120 may further include a third switch. The third switch may be disposed on the side of the second base 112 facing the landscape creation part 121 and be in communication connection with at least one of the driving mechanism 122 or the control module 200. The third switch may be disposed in a moving path of the landscape creation part 121. When the landscape creation part 121 moves along the target direction and touches the third switch, the third switch controls the driving mechanism 122 to stop driving the lead screw 122C to rotate or controls the control module 200 to send an instruction of stopping running to the driving mechanism 122.

In some exemplary embodiments, each telescopic unit 120 may include any two or three of the first switch 123, the second switch, and the third switch.

The second switch and the third switch may be both configured to control the initialization of M landscape generation modules 100. For the specific method, a reference may be made to the first switch 123, which will not be described redundantly here in this disclosure.

In the structure shown in FIG. 14 to FIG. 17, the length of the preset interval depends on the distance between the first base 111 and the second base 112. Therefore, in order to obtain a greater length of the preset interval, the distance between the first base 111 and the second base 112 needs to be increased. The length of the preset interval in the structure shown in FIG. 2 to FIG. 3 depends on the length of the lead screw 122C because a greater length of the preset interval can be obtained by increasing the length of the lead screw 122C. Compared with the structure shown in FIG. 14 o FIG. 17, the structure shown in FIG. 2 to FIG. 3 is applicable to wider scenarios and can meet the requirements of more complex preset landscapes.

Another aspect of this disclosure provides a non-transitory storage medium that stores at least one set of executable instructions for data processing. When the executable instructions are executed by a processor, the executable instructions instruct the control module 200 to control the running of the driving mechanism 122. In some possible implementations, the aspects of this disclosure may further be implemented in a form of a program product, including program code. When the program product runs on the control module 200, the program code is configured to enable the control module 200 to perform the running method for generating the preset landscape by the control module 200 described in this disclosure. The program product for implementing the above-mentioned method may be a portable compact disk read-only memory (CD-ROM) and include a program code, and may be run on the control module 200. However, the program product of this disclosure is not limited hereto. In this disclosure, the computer-readable storage medium may be any tangible medium that contains or stores a program, and the program may be used by or in combination with an instruction execution system. The program product may be any combination of one or more readable media. The readable medium may be a readable signal medium or a readable storage medium. The readable storage medium may be, for example, but not limited to, electrical, magnetic, optical, electromagnetic, infrared, or semiconductor systems, apparatuses, or devices, or any combination thereof. More specific examples of the readable storage medium include an electrical connection with one or more conducting wires, a portable computer disk, a hard disk, a random access memory (RAM), a read-only memory (ROM), an erasable programmable ROM (an EPROM or a flash memory), an optical fiber, a portable CD-ROM, an optical storage device, a magnetic storage device, or any suitable combination thereof. The computer-readable storage medium may include a data signal propagated in a baseband or as a part of a carrier, and readable program code is carried therein. The propagated data signal may be in various forms, including but not limited to an electromagnetic signal, an optical signal, or any suitable combination thereof. The readable storage medium may alternatively be any readable medium other than the readable storage medium. The readable medium may send, propagate, or transmit a program to be used by or in combination with the instruction execution system, apparatus, or device. The program code contained on the readable storage medium may be transmitted using any suitable medium, including but not limited to: a wireless medium, a wired medium, an optical fiber, an RF, or any suitable combination thereof. Program code for executing the operations in this disclosure may be compiled by using one or more programming languages or any combination thereof. The programming languages include object oriented programming languages, such as Java and C++, and conventional procedural programming languages, such as C or similar programming languages. The program code can be executed fully on the control module 200, executed partially on the control module 200, executed as an independent software package, executed partially on the control module 200 and partially on a remote computing device, or executed fully on the remote computing device.

The foregoing describes the specific embodiments of the present disclosure. Other embodiments fall within the scope of the appended claims. In some cases, the actions or steps described in the claims may be performed in sequences different from those in the embodiments and still achieve expected results. In addition, the processes depicted in the accompanying drawings do not necessarily require the specific orders or sequential orders shown for achieving the expected results. In some implementations, multitasking and parallel processing are also possible or may be advantageous.

In summary, after reading this detailed disclosure, those skilled in the art can understand that the foregoing detailed disclosure may be presented by way of example only, and may not be limited. Although there is no clear description, those skilled in the art can understand that the present disclosure intends to cover various reasonable changes, improvements, and modifications of the embodiments. These changes, improvements, and modifications are intended to be proposed in the present disclosure and are within the spirit and scope of the exemplary embodiments of the present disclosure.

In addition, some specific terms in the present disclosure have been used to describe the embodiments of the present disclosure. For example, "one embodiment", "an embodiment", and/or "some exemplary embodiments" mean that a specific feature, structure, or characteristic described in combination with the embodiment may be included in at least one embodiment of the present disclosure. Therefore, it can be emphasized and should be understood that two or more references to "an embodiment" or "one embodiment" or "an alternative embodiment" in various parts of this disclosure do not necessarily all refer to the same embodiment. In addition, specific feature, structure, or characteristic may be appropriately combined in one or more embodiments of the present disclosure. It should be understood that in the foregoing description of the embodiments of the present disclosure, to help understand a feature, and for the purpose of simplifying the present disclosure, the present disclosure sometimes combines various features in a single embodiment, a drawing, or description thereof. However, this does not mean that the combination of these features is necessary. It is entirely possible for those skilled in the art to mark some of the devices as a single embodiment for understanding when reading this application. In other words, the embodiments in the present disclosure can also be understood as an integration of multiple sub-embodiments. The content of each sub-embodiment is also true when it is less than all the characteristics of a single previously disclosed embodiment.

Each patent, patent application, patent application publication and other materials cited herein, such as articles, books, specifications, publications, documents, articles and the like, may be incorporated herein by reference, and used for all purposes associated with this disclosure now or in the future. In addition, if the description, definition, and/or use of terms in any associated materials contained herein is inconsistent with or in conflict with that in this document, the terms in this document shall prevail.

Finally, it should be understood that the embodiment of the present disclosure provided herein is an explanation of the principle of the embodiment of the present disclosure. Other modified embodiments are also within the scope of the present disclosure. Therefore, the embodiments disclosed in the present disclosure are merely examples rather than limitations. Those skilled in the art can adopt alternative configurations according to the embodiments in the present disclosure to implement the present disclosure in the present disclosure. Therefore, the embodiments of the present disclosure are not limited to those exactly described in the present disclosure.

What is claimed is:

1. A landscape generation system, comprising: at least one landscape generation module, wherein each landscape generation module comprises:

a base frame, comprising a first base; and

N telescopic units, connected with the base frame and arranged in an array, wherein N is an integer greater than 1, and each telescopic unit comprises:

a landscape creation part, and a driving mechanism, mechanically connected with the landscape creation part and the base frame, during operation, the driving mechanism drives the landscape creation part to move within a preset interval along a target direction to adjust a distance between an end face of the landscape creation part and the base frame, and stops and locks the landscape creation part at any position within the preset interval so as to generate part of a preset landscape; wherein the driving mechanism comprises:

a driving element, connected with the landscape creation part, a lead screw, disposed along the target direction and in threaded connection with the driving element, comprising a work portion extending outside of the first base along the target direction, a first end, and a second end, wherein the lead screw is configured to rotate to drive the driving element to move along the work portion between the first end and the second end to generate part of a preset landscape, a guide rail, disposed along the target direction and fixedly connected with the first base, wherein the landscape creation part is slidably arranged on the guide rail, and a limiting member, disposed at the first end to abut against the guide rail and the landscape creation part so as to limit the landscape creation part from twisting.

2. The landscape generation system according to claim 1, wherein the landscape creation part has a first projection in the target direction;

the driving mechanism has a second projection in the target direction; and the second projection is located within the first projection.

3. The landscape generation system according to claim 2, wherein an area of the first projection of the landscape creation part in the target direction is between 4 $cm^2$ and 16 $cm^2$.

4. The landscape generation system according to claim 1, wherein the lead screw has a screw thread, and a lift angle of the screw thread is smaller than a frictional angle of the threaded connection between the lead screw and the driving element.

5. The landscape generation system according to claim 1, wherein the driving mechanism further comprises:

a motor assembly, connected with the second end to drive the lead screw to rotate.

6. The landscape generation system according to claim 5, wherein the motor assembly comprises:

a speed reducer, connected with the second end; and a motor, connected with the speed reducer, wherein during the operation, the motor drives the lead screw to rotate via the speed reducer.

7. The landscape generation system according to claim 5, wherein the motor assembly comprises an output shaft, and the output shaft is connected with the second end via a coupling.

8. The landscape generation system according to claim 1, further comprising:

a control module, wherein the at least one landscape generation module comprises M landscape generation modules arranged in an array, and the control module is in communication with the M landscape generation modules, and during the operation, the control module determines a target position for each landscape creation part among the M landscape generation modules based on the preset landscape, and controls corresponding driving mechanisms based on the target position of each landscape creation part.

9. The landscape generation system according to claim 8, wherein the control module is configured to control the motor of the corresponding driving mechanism to rotate the lead screw such that the landscape creation part reaches the target position.

10. The landscape generation system according to claim 8, wherein the preset landscape is a dynamic landscape.

11. The landscape generation system according to claim 1, further comprising:

a first switch, disposed on the first base, and in communication with at least one of the driving mechanism or the control module, wherein the first switch is arranged in a moving path of the driving element, and when the driving element moves along the target direction and contacts the first switch, the first switch controls the driving mechanism to stop driving the lead screw to rotate, or controls the control module to send a stop instruction to the driving mechanism.

12. The landscape generation system according to claim 1, further comprising:

a flexible cover, configured to cover the landscape creation parts of the at least one landscape generation module such that the flexible cover forms the preset landscape when each landscape generation module reaches a target position.

13. The landscape generation system according to claim 1, wherein, the landscape creation part comprises a pattern display part to simulate an environmental element of the preset landscape; and the preset landscape comprises at least one of a preset building landscape or a preset facility landscape.

14. A landscape generation system, comprising: at least one landscape generation module, wherein each landscape generation module comprises:

a base frame, comprising a first base, a second base, and at least one support connected to the first base and the second base; and N telescopic units, connected with the base frame and arranged in an array, wherein N is an integer greater than 1, and each telescopic unit comprises:

a landscape creation part, and a driving mechanism, mechanically connected with the landscape creation part and the base frame, during operation, the driving mechanism drives the landscape creation part to move within a preset interval along a target direction to adjust a distance between an end face of the landscape creation part and the base frame, and stops and locks the landscape creation part at any position within the preset interval so as to generate part of a preset landscape; wherein the driving mechanism comprises:

a driving element, a connecting rod, connecting the driving element and the landscape creation part, and a lead screw, disposed along the target direction and in threaded connection with the driving element, comprising a work portion extending outside of the first base along the target direction, a first end, and a second end, and disposed along the target direction and in threaded connection with the driving element, wherein the lead screw is configured to, when rotating, drive the driving element to move between the first base and the second base.

15. The landscape generation system according to claim 14, wherein the leadscrew has a screw thread, and a lift angle of the screw thread is smaller than a frictional angle of the threaded connection between the lead screw and the driving element.

16. The landscape generation system according to claim 14, wherein the driving mechanism further comprises:

a motor assembly, connected with the second end to drive the lead screw to rotate.

17. The landscape generation system according to claim 16, wherein the motor assembly comprises:

a speed reducer, connected with the second end; and a motor, connected with the speed reducer, wherein during the operation, the motor drives the lead screw to rotate via the speed reducer.

18. The landscape generation system according to claim 16, wherein the motor assembly comprises an output shaft, and the output shaft is connected with the second end via a coupling.

19. The landscape generation system according to claim 14, wherein the first base comprises a first hole, and the connecting rod slidably passes through the first hole.

20. The landscape generation system according to claim 14, wherein the driving mechanism further comprises:

a guide rail, disposed along the target direction, wherein the guide rail is slidably connected with the driving element and fixedly connected with the first base and the second base.

* * * * *